United States Patent
Honya et al.

(10) Patent No.: US 10,353,322 B2
(45) Date of Patent: Jul. 16, 2019

(54) INTERMEDIATE TRANSFER BELT, IMAGE FORMING APPARATUS, AND METHOD FOR PRODUCING INTERMEDIATE TRANSFER BELT

(71) Applicant: Konica Minolta, Inc., Tokyo (JP)

(72) Inventors: Akihiro Honya, Tokyo (JP); Teruo Sasaki, Tokyo (JP); Shinichi Yabuki, Kanagawa (JP); Junji Kanda, Aichi (JP)

(73) Assignee: KONICA MINOLTA, INC., Tokyo (JP)

(*) Notice: Subject to any disclaimer, the term of this patent is extended or adjusted under 35 U.S.C. 154(b) by 57 days.

(21) Appl. No.: 15/712,401

(22) Filed: Sep. 22, 2017

(65) Prior Publication Data

US 2018/0095384 A1 Apr. 5, 2018

(30) Foreign Application Priority Data

Sep. 30, 2016 (JP) .................................. 2016-194346

(51) Int. Cl.
| | |
|---|---|
| *G03G 15/14* | (2006.01) |
| *G03G 15/16* | (2006.01) |
| *C08F 2/48* | (2006.01) |
| *G03G 15/01* | (2006.01) |

(52) U.S. Cl.
CPC .............. *G03G 15/162* (2013.01); *C08F 2/48* (2013.01); *G03G 15/0189* (2013.01); *G03G 2215/0129* (2013.01)

(58) Field of Classification Search
CPC ..... C08K 5/33; G03G 15/162; G03G 15/0189
See application file for complete search history.

(56) References Cited

U.S. PATENT DOCUMENTS

| | | |
|---|---|---|
| 2012/0064350 A1 | 3/2012 | Honya et al. |
| 2013/0028587 A1 | 1/2013 | Kaneko et al. |
| 2014/0147776 A1* | 5/2014 | Ito .......................... G03F 7/038 430/18 |

(Continued)

FOREIGN PATENT DOCUMENTS

| | | |
|---|---|---|
| EP | 1957457 A1 | 8/2008 |
| EP | 2407456 A1 | 1/2012 |

(Continued)

OTHER PUBLICATIONS

Extended European Search Report dated Mar. 14, 2018 for corresponding European Application No. 17194326.9.

*Primary Examiner* — Ramsey Zacharia
(74) *Attorney, Agent, or Firm* — Lucas & Mercanti, LLP

(57) ABSTRACT

An endless intermediate transfer belt includes a substrate layer, and a surface layer to be disposed on the substrate layer. The surface layer is configured by a polymerized cured product of a radical polymerizable composition including a radical polymerizable monomer having a radical polymerizable functional group, an oxime ester-based photopolymerization initiator having a carbazole structure, and a metal oxide particle subjected to surface treatment. The radical polymerizable functional group corresponds to one or both of an acryloyl group and a methacryloyl group. The metal oxide particle subjected to surface treatment includes a metal oxide particle, and a substance for support, to be supported on a surface of the metal oxide particle.

8 Claims, 2 Drawing Sheets

(56) References Cited

U.S. PATENT DOCUMENTS

2015/0307481 A1* 10/2015 Qian .................. C07D 405/06
544/142

FOREIGN PATENT DOCUMENTS

| JP | 5632396 B2 | 10/2014 |
|----|------------|---------|
| WO | 2007062963 A1 | 6/2007 |
| WO | 2009019173 A1 | 2/2009 |

* cited by examiner

INTERMEDIATE TRANSFER BELT, IMAGE FORMING APPARATUS, AND METHOD FOR PRODUCING INTERMEDIATE TRANSFER BELT

CROSS REFERENCE TO RELATED APPLICATIONS

Japanese Patent Application No. 2016-194346 filed on Sep. 30, 2016, including description, claims, drawings, and abstract the entire disclosure is incorporated herein by reference in its entirety.

BACKGROUND

Technological Field

The present invention relates to an intermediate transfer belt, an image forming apparatus including the intermediate transfer belt, and a method for producing the intermediate transfer belt.

Description of Related Art

In an image forming apparatus, a toner image formed on a photoconductor is transferred to an intermediate transfer member, and thereafter transferred to a recording medium such as normal paper. The residual toner remaining on the surface of the intermediate transfer member after transfer of the toner image is then removed by a cleaning member in abutment with the surface of the intermediate transfer member.

The intermediate transfer member is, for example, an endless intermediate transfer belt including a substrate layer, and a surface layer disposed on the substrate layer. The surface layer can be formed to thereby realize an intermediate transfer belt excellent in both of durability and high image quality (for example, Japanese Patent No. 5632396 (PLT1)).

The surface layer of an intermediate transfer belt described in PTL 1 includes an ultraviolet curable resin. Examples of the ultraviolet curable resin include an acrylic resin.

When the ultraviolet curable resin of the surface layer in the intermediate transfer belt is an acrylic resin, the toner remaining on the surface of the surface layer is removed by an elastic blade (cleaning blade), to result in a large frictional force between the surface layer and the cleaning blade, thereby causing the tip of the cleaning blade to be deformed (turn-up of the blade) and/or causing the cleaning blade to be remarkably worn. An image forming apparatus including such an intermediate transfer belt may cause any cleaning failures to occur at a cleaning stage after transfer of a toner image, thereby enabling no high quality image to be formed.

PTL 1 does not provide any description about cleaning failures due to the friction between the surface layer and the cleaning blade (cleaning member) of the intermediate transfer belt.

SUMMARY

A first object of the present invention is to provide an intermediate transfer belt low in frictional force of a surface layer against a cleaning blade. A second object of the present invention is to provide an image forming apparatus that can suppress the occurrence of cleaning failures on an intermediate transfer belt.

To achieve the first object, according to an aspect of the present invention, an endless intermediate transfer belt reflecting one aspect of the present invention comprises a substrate layer, and a surface layer to be disposed on the substrate layer, wherein the surface layer is configured by a polymerized cured product of a radical polymerizable composition comprising a radical polymerizable monomer having a radical polymerizable functional group, an oxime ester-based photopolymerization initiator having a carbazole structure, and a metal oxide particle subjected to surface treatment, the radical polymerizable functional group corresponds to one or both of an acryloyl group and a methacryloyl group, and the metal oxide particle subjected to surface treatment comprises a metal oxide particle, and a substance for support, to be supported on a surface of the metal oxide particle.

To achieve the second object, according to an aspect of the present invention, an image forming apparatus reflecting one aspect of the present invention comprises an intermediate transfer belt that transfers a toner image formed on a photoconductor to a recording medium, and a cleaning member that has elasticity and that abuts with the intermediate transfer belt to remove an attachment on the intermediate transfer belt, wherein the intermediate transfer belt is the intermediate transfer belt according to the present invention.

To achieve the first object, according to an aspect of the present invention, a method reflecting one aspect of the present invention is a method for producing an endless intermediate transfer belt comprising a substrate layer, and a surface layer to be disposed on the substrate layer, the method comprising: coating the substrate layer with a radical polymerizable composition comprising a radical polymerizable monomer having one or both of an acryloyl group and a methacryloyl group, a photopolymerization initiator, and a metal oxide particle subjected to surface treatment as a metal oxide particle that supports a substance for support, to form a coating film of the radical polymerizable composition on the substrate layer; and irradiating the coating film with actinic radiation to polymerize the radical polymerizable monomer, thereby forming the surface layer, wherein an oxime ester-based photopolymerization initiator having a carbazole structure is used as the photopolymerization initiator.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

[Intermediate Transfer Belt]

Figure 1A:
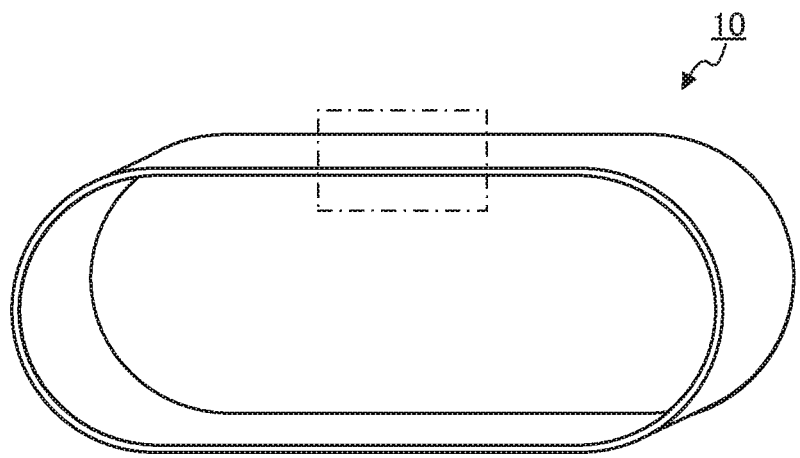
FIG. 1A schematically illustrates one example of the intermediate transfer belt of the present invention.
Figure 1B:
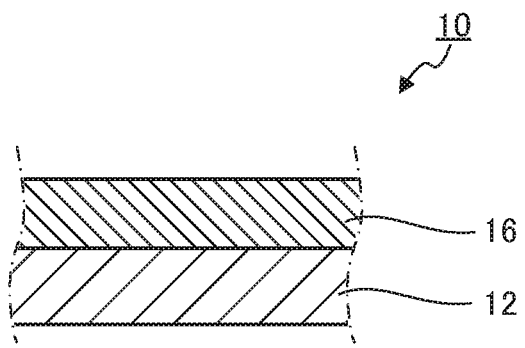
FIG. 1B schematically illustrates a layer structure of the intermediate transfer belt illustrated in FIG. 1A.

The intermediate transfer belt according to the present invention is described with reference to the drawings in detail. FIG. 1A schematically illustrates intermediate transfer belt 10 according to the present embodiment. FIG. 1B illustrates a partially enlarged cross sectional view of an area indicated by a dashed line in FIG. 1A, and schematically illustrates a layer structure of intermediate transfer belt 10.

Intermediate transfer belt 10 is an endless belt, as illustrated in FIG. 1A. Intermediate transfer belt 10 includes substrate layer 12, and surface layer 16 on substrate layer 12, as illustrated in FIG. 1B. Intermediate transfer belt 10 can be configured in the same manner as in a known intermediate transfer belt except for the configuration of surface layer 16.

(Substrate Layer)

Substrate layer 12 supports surface layer 16 by an endless belt having predetermined conductivity and flexibility. Substrate layer 12 is configured by, for example, a resin having flexibility. Intermediate transfer belt 10 is increased in mechanical strength and durability by substrate layer 12. The thickness of substrate layer 12 is preferably 30 to 140 μm, more preferably 50 to 130 μm. The thickness of substrate layer 12 is determined by, for example, cutting intermediate transfer belt 10 in the stacking direction to provide cross sections, and measuring the thickness at each of the cross sections and/or calculating the average thereof.

Examples of the resin that forms substrate layer 12 include polyimide (PI), polyamide (PA), polyamideimide (PAI), polyether ketone (PEK), polyether ether ketone (PEEK), polyvinylidene fluoride (PVDF), polycarbonate (PC), polyphenylene sulfide (PPS), polymethyl methacrylate (PMMA), polystyrene (PS), a polyacrylonitrile-styrene copolymer, polyvinyl chloride (PVC), acetate, acrylonitrile-butadiene-styrene (ABS) and polyester (PE).

The resin that forms substrate layer 12 is preferably polyimide (PI), polyamideimide (PAI), polyphenylene sulfide (PPS) or polyether ether ketone (PEEK) from the viewpoint of increases in mechanical strength and durability.

Substrate layer 12 may also contain an additive as long as at least one of the effects of the present embodiment is achieved. Examples of the additive include a conductive filler, a dispersant and a lubricant.

The conductive filler adjusts resistances (volume resistance and surface resistance) of substrate layer 12. Examples of the conductive filler include carbon fillers such as carbon black and graphite; metallic fillers such as aluminum, copper, and alloys thereof; and metal oxide-based fillers such as tin oxide, zinc oxide, antimony oxide, indium oxide, potassium titanate, antimony oxide-tin oxide composite oxide (ATO) and indium oxide-tin oxide composite oxide (ITO).

The conductive filler is preferably a carbon filler, particularly preferably carbon black among carbon fillers. The surface of carbon black may be subjected to oxidation treatment. Such conductive fillers may be used singly or in combinations thereof.

The content of the conductive filler can be appropriately adjusted depending on the type of the conductive filler, and predetermined resistances (volume resistance and surface resistance) of substrate layer 12. The content of the conductive filler is, for example, 4 to 40 parts by weight, preferably 10 to 30 parts by weight based on 100 parts by weight of the resin that forms substrate layer 12.

A dispersant adjusts dispersibility of the conductive filler. The type of the dispersant can be appropriately selected depending on the material of the resin that forms substrate layer 12, in terms of compatibility with the resin and dispersibility of the conductive filler. For example, when the resin is PPS or PEEK, the dispersant is preferably an ethylene glycidyl methacrylate-acrylonitrile styrene copolymer.

The content of the dispersant can be appropriately adjusted depending on predetermined dispersibility of the conductive filler. For example, the content is 0.1 to 10 parts by weight, preferably 0.5 to 5 parts by weight based on 100 parts by weight of the resin that forms substrate layer 12.

The lubricant enhances moldability of substrate layer 12. Examples of the lubricant include aliphatic hydrocarbons such as paraffin wax, higher fatty acids such as lauric acid, myristic acid, palmitic acid, stearic acid, behenic acid and montanic acid, and metal salts of the higher fatty acids. Such lubricants may be used singly or in combinations thereof.

When the resin that forms substrate layer 12 is polyphenylene sulfide, the lubricant is preferably calcium montanate.

The content of the lubricant is, for example, 0.1 to 0.5 parts by weight, preferably 0.1 to 0.3 parts by weight based on 100 parts by weight of the resin that forms substrate layer 12.

(Surface Layer)

Surface layer 16 is disposed on the outer peripheral surface of substrate layer 12, and is a layer configured by an integrated polymerized cured product of a radical polymerizable composition. Surface layer 16 protects a layer (substrate layer 12 in the present embodiment) located inside of surface layer 16. Surface layer 16 has proper flexibility, and durabilities (mechanical strength, releasability, and the like) sufficient for contact with a photoconductor and a recording medium.

The radical polymerizable composition includes a radical polymerizable monomer having a (meth)acryloyl group, an oxime ester-based photopolymerization initiator having a carbazole structure, and a metal oxide particle subjected to surface treatment. Herein, the "(meth)acryloyl group" is a radical polymerizable functional group, and means one or both of an acryloyl group and a methacryloyl group.

The radical polymerizable monomer has number a of alkylene oxide structure(s) and number b of (meth)acryloyl group(s), and it is preferable that such an alkylene oxide structure include an alkylene group having 2 or more carbon atoms, and that a and b be each a positive integer and satisfy the following expressions (1) and (2). If ratio a/b is too large, the molecular weight of the radical polymerizable monomer may be so high that a dense crosslinked structure cannot be formed, resulting in reductions in wear resistance and hardness of surface layer 16. If b is too small, a three dimensional crosslinked structure may be hardly formed, resulting in reductions in wear resistance and hardness of surface layer 16.

$$a/b \leq 5 \qquad (1)$$

$$b \geq 3 \qquad (2)$$

For example, a is preferably 10 or less, more preferably 6 or less. While b may be 3 or more, it is preferably 3 or more and 10 or less, more preferably 3 or more and 6 or less from the viewpoint of an increase in reactivity of the (meth)acryloyl group.

The radical polymerizable monomer has such alkylene oxide structure(s), and therefore, when the radical polymerizable composition is cured by radical polymerization, (meth)acryloyl group(s) is/are easily moved in the radical polymerizable composition and brought into contact with other (meth)acryloyl group at a higher probability. Thus, a curing (crosslinking) reaction can efficiently progress, thereby reducing the number of unreacted (meth)acryloyl residue(s) and also forming a dense crosslinked structure. As a result, charge trapping can be suppressed, the chemical change (degradation) of (meth)acryloyl group(s) due to a discharge product and steam can be suppressed, and scratch resistance and wear resistance of surface layer 16 can be enhanced.

Preferably, a and b further satisfy the following expression (3) from the viewpoint of enhancements in cleaning property and transfer function.

$$a/b \leq 3 \quad (3)$$

Preferably, a and b further satisfy the following expression (4) from the viewpoint that an alkylene group is uniformly introduced into the alkylene oxide structure.

$$1 \leq a/b \leq 5 \quad (4)$$

The alkylene oxide structure means a structure where an alkylene group and a divalent oxygen atom are bound to each other. For example, when the alkylene group is represented by "-A-" and the divalent oxygen atom is represented by "—O—", the alkylene oxide structure means a structure represented by "-A-O—". Here, number a of the alkylene oxide structures may be the same as or different from each other.

The alkylene group of the alkylene oxide structure preferably has independently 2 to 5 carbon atoms from the viewpoint that durability of surface layer 16 and reactivity of the radical polymerizable monomer are enhanced. The number of carbon atoms of each alkylene group in number a of the alkylene oxide structures may be the same as or different from each other.

The alkylene group may be linear or branched. Examples of the alkylene group include an ethylene group, a propylene group, an isopropylene group, a butylene group, an isobutylene group, a pentylene group and a 1,2-propylene group.

The equivalent of the (meth)acryloyl group in the radical polymerizable monomer can be appropriately adjusted as long as at least one of the effects of the present embodiment is achieved. The equivalent of the (meth)acryloyl group is preferably 100 to 300 g/mol, more preferably 130 to 250 g/mol in terms of hardness, cleaning property and transfer rate of surface layer 16.

Examples of the radical polymerizable monomer include compounds represented by the following chemical formulae (M-1) to (M-19). In the following chemical formulae (M-1) to (M-19), R represents a (meth)acryloyl group. That is, the number of R(s) represents the number of (meth)acryloyl group(s).

[Formula 1]

(M-1)

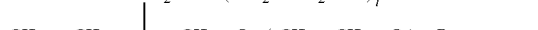
(M-2)

(M-3)

(M-4)

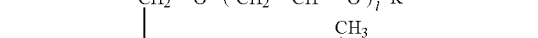

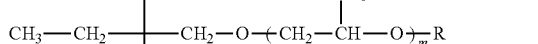
(M-5)

In chemical formulae (M-1) to (M-5), l, m and n each denote an integer of 0 or more, and satisfy $1 \leq l+m+n \leq 30$. Herein, the number a of alkylene oxide structure(s) corresponds to the sum of l, m and n, and the number b of (meth)acryloyl group(s) corresponds to the number (3) of R's.

[Formula 2]

(M-6)

(M-7)

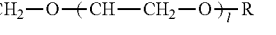

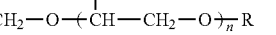

-continued
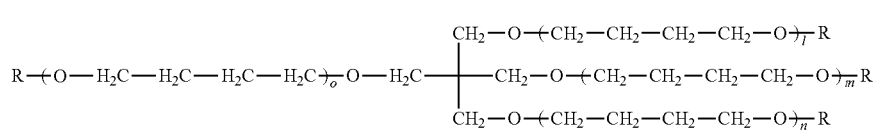
(M-8)
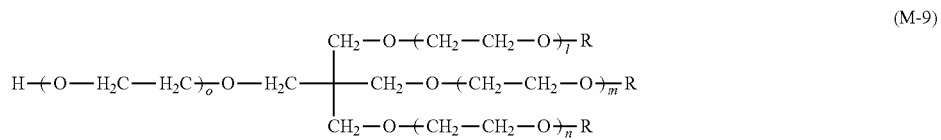
(M-9)
[Formula 3]
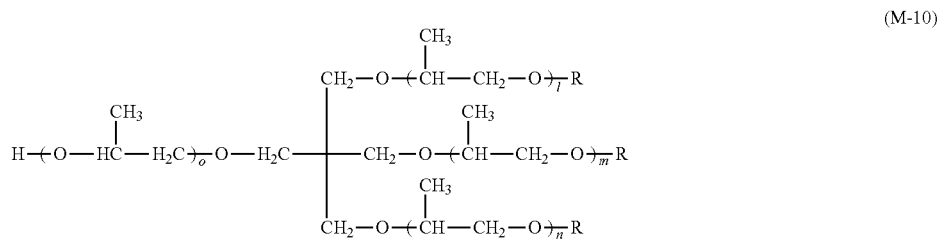
(M-10)
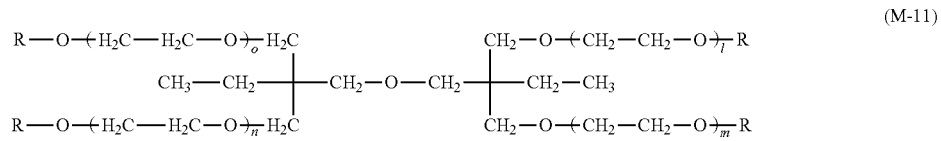
(M-11)
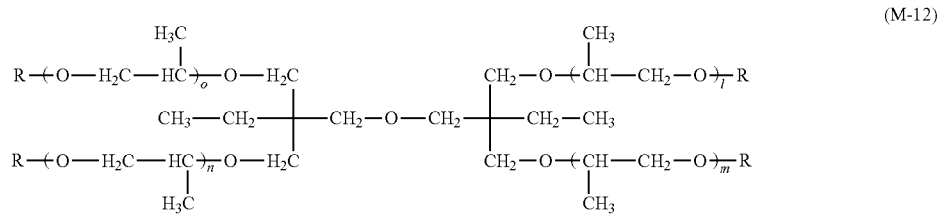
(M-12)
In chemical formulae (M-6) to (M-12), l, m, n and o each denote an integer of 0 or more, and satisfy $1 \leq l+m+n+o \leq 40$. Herein, the number a of alkylene oxide structure(s) corresponds to the sum of l, m, n and o, and the number b of (meth)acryloyl group(s) corresponds to the number (4) of R's.
[Formula 4]
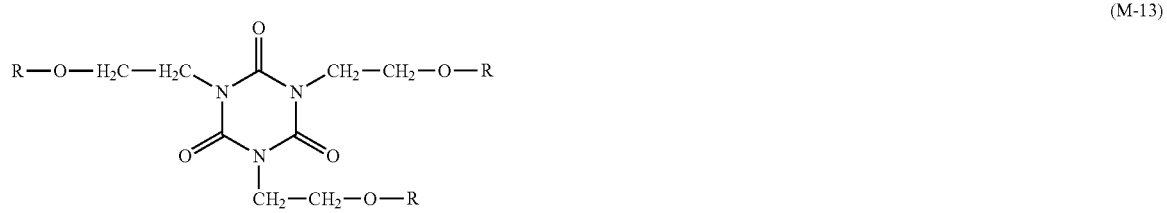
(M-13)
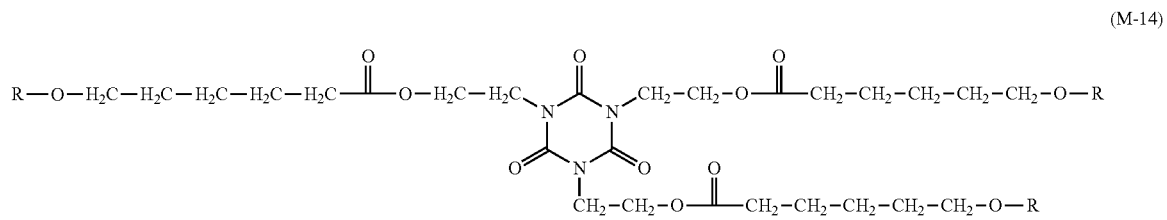
(M-14)

In chemical formula (M-13), the number a of alkylene oxide structure(s) is 3, and the number b of (meth)acryloyl group(s) is 3. In chemical formula (M-14), the number a of alkylene oxide structure(s) is 6, and the number b of (meth)acryloyl group(s) is 3.

[Formula 5]

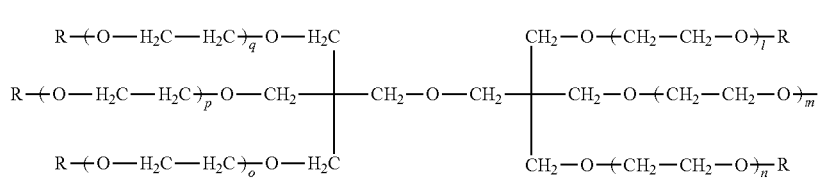

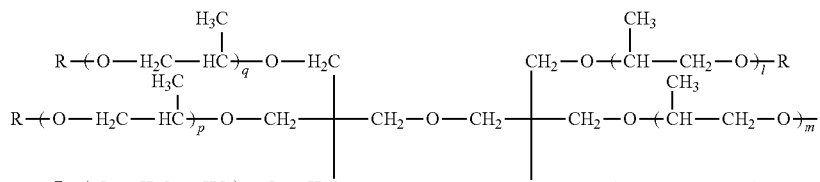

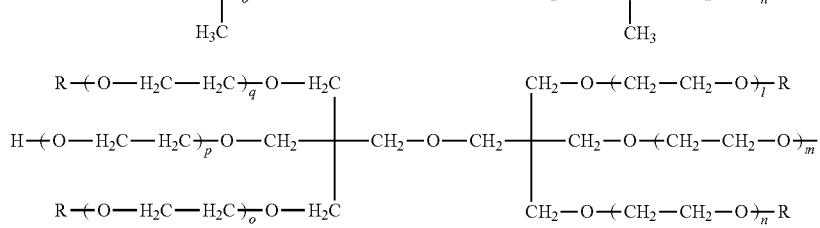

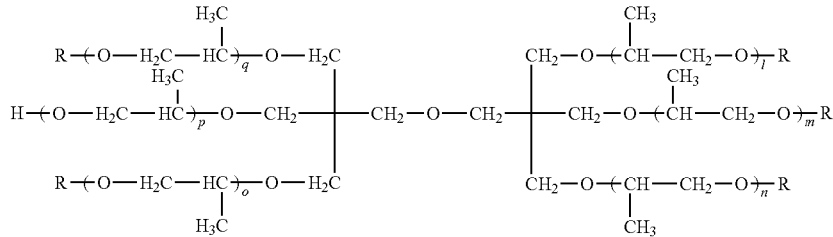

In chemical formulae (M-15) to (M-18), l, m, n, o, p and q each denote an integer of 0 or more, and satisfy $1 \leq l+m+n+o+p+q \leq 60$. Herein, the number a of alkylene oxide structure(s) corresponds to the sum of l, m, n, o, p and q, and the number b of (meth)acryloyl group(s) corresponds to the number (6) of R's.

[Formula 6]

the compound represented by the left formula are randomly substituted with two kinds of compounds represented by the right formula.

Specific examples of polyfunctional (meth)acrylic monomers represented by chemical formulae (M-1) to (M-19) include ethoxylated (12) dipentaerythritol hexa(meth)acrylate (a/b=2, b=6), caprolactone-modified (6) dipentaerythritol hexa(meth)acrylate (a/b=1, b=6), ethoxylated (3) trimethylolpropane tri(meth)acrylate (a/b=1, b=3), ethoxylated (8) pentaerythritol tetra(meth)acrylate (a/b=2, b=4), ethoxylated (35) pentaerythritol tetra(meth)acrylate (a/b=8.75, b=4), and ethoxylated (15) pentaerythritol tetra(meth)acry-

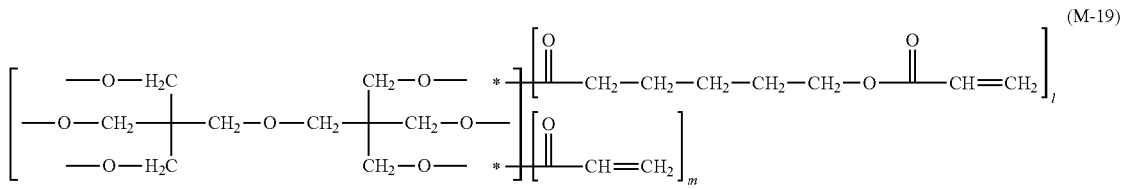

In chemical formula (M-19), l and m each denote a positive integer, and satisfy $2 \leq l+m \leq 6$. The number a of alkylene oxide structure(s) is 1, and the number b of (meth)acryloyl group(s) corresponds to l+m. In chemical formula (M-19), it is indicated that six positions for substitution on late (a/b=5, b=3). Herein, the numerical value noted in brackets of each compound represents the number a of alkylene oxide structure(s).

The radical polymerizable monomer may be a synthetic compound or a commercial product. Examples of the commercial product of the radical polymerizable monomer include KAYARAD DPEA-12, KAYARAD DPCA-60 and KAYARAD TPA-330 (produced by Nippon Kayaku Co., Ltd., "KAYARAD" is a registered trademark of the Company); M-DPH-12E, ATM-8EL and TM-35E (produced by Shin-Nakamura Chemical Co., Ltd.); and SR9035 (produced by Sartomer).

Such radical polymerizable monomers may be used singly or in combinations thereof. The radical polymerizable monomer that forms surface layer 16 can be presumed from, for example, the analysis results of surface layer 16 by pyrolysis GC-MS.

(Photopolymerization Initiator)

The photopolymerization initiator is an oxime ester compound having a carbazole structure. Examples of the photopolymerization initiator include a compound represented by the following general formula (1). While geometric isomers are present due to a double bond of oxime in the oxime ester compound, the photopolymerization initiator may be any of the geometric isomers, and is not limited to a structure represented by the following general formula (1).

[Formula 7]

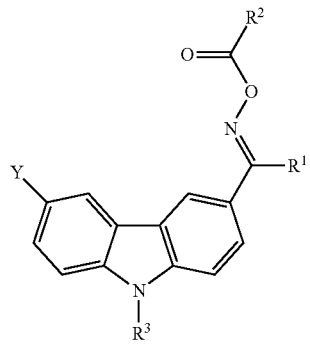

General formula (1)

In general formula (1), $R^1$ represents a $C_{1-20}$ alkyl group, a $C_{6-30}$ aryl group, a $C_{7-30}$ arylalkyl group or a cyano group.

Each hydrogen atom of the alkyl group, the aryl group and the arylalkyl group represented by $R^1$ may be independently optionally replaced by $-OR^{11}$, $-COR^{11}$, $-SR^{11}$, $-NR^{12}R^{13}$, $-NCOR^{12}$, $-OCOR^{13}$, $-CN$, $-NO_2$, a halogen atom, $-CR^{11}=CR^{12}R^{13}$ or $-CO-CR^{11}=CR^{12}R^{13}$. $R^{11}$, $R^{12}$ and $R^{13}$ each represent a hydrogen atom, a $C_{1-20}$ alkyl group, a $C_{6-30}$ aryl group, a $C_{7-30}$ arylalkyl group or a $C_{2-20}$ heterocyclic group.

In general formula (1), $R^2$ represents $R^{21}$ or $OR^{21}$. $R^{21}$ represents a $C_{1-20}$ alkyl group, a $C_{6-30}$ aryl group or a $C_{7-30}$ arylalkyl group. Each hydrogen atom of the alkyl group, the aryl group and the arylalkyl group represented by $R^{21}$ may be independently optionally replaced by a halogen atom.

In general formula (1), $R^3$ represents a $C_{1-20}$ alkyl group, a $C_{6-30}$ aryl group or a $C_{7-30}$ arylalkyl group.

The alkylene moiety of a substituent represented by each of $R^1$, $R^3$, $R^{11}$, $R^{12}$, and $R^{13}$ may be interrupted by an unsaturated bond, an ether bond, a thioether bond, an ester bond, a thioester bond, an amide bond or a urethane bond once to 5 times. The alkyl moiety of the substituent may be branched alkyl or cyclic alkyl. The terminal of the substituent may be an unsaturated bond. Furthermore, $R^3$ may be taken together with a benzene ring of the carbazole structure to form a ring.

In general formula (1), Y represents a nitro group or a substituent represented by any one of the following chemical formulae (Y-1) to (Y-19).

[Formula 8]

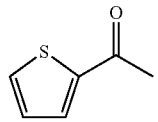

(Y-1)

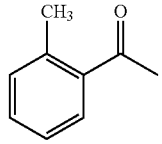

(Y-2)

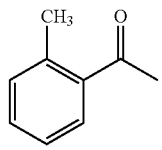

(Y-3)

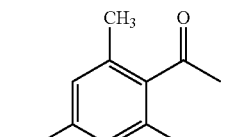

(Y-4)

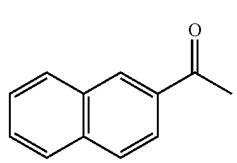

(Y-5)

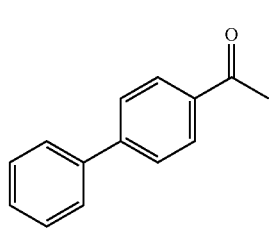

(Y-6)

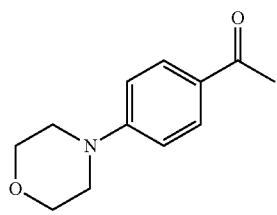

(Y-7)

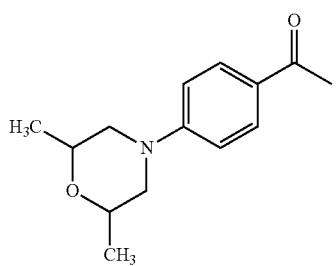

(Y-8)

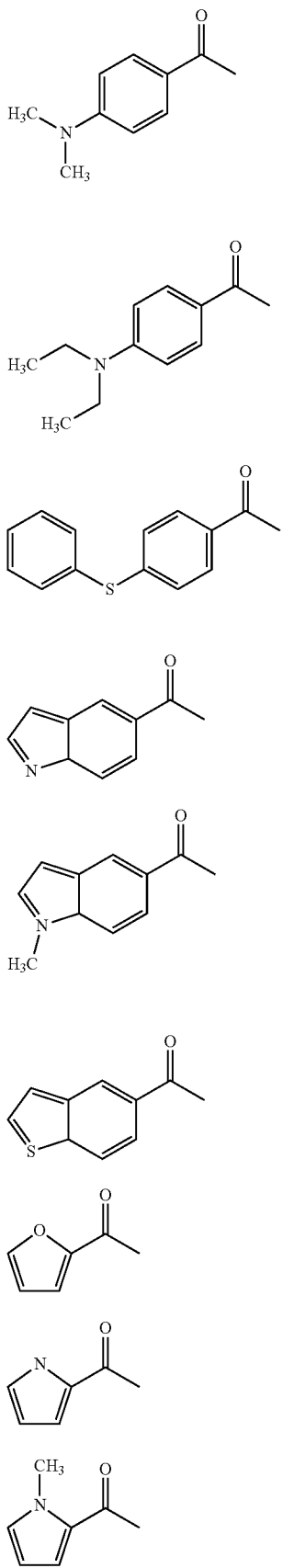
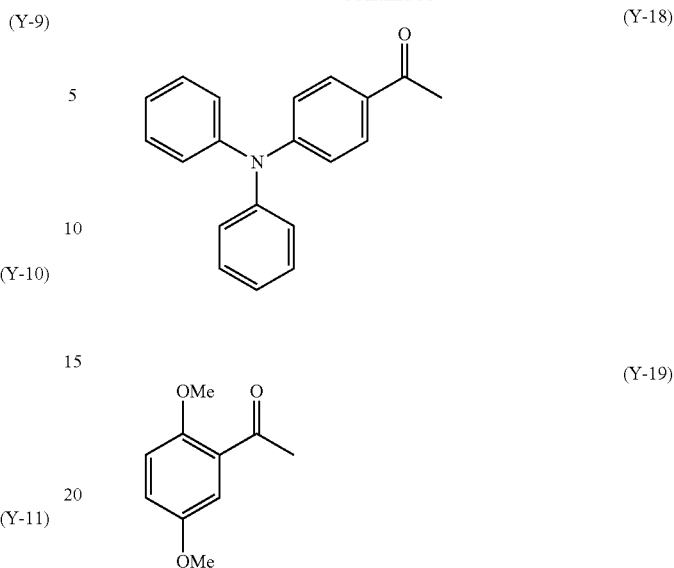

(Y-9)
(Y-10)
(Y-11)
(Y-12)
(Y-13)
(Y-14)
(Y-15)
(Y-16)
(Y-17)
(Y-18)
(Y-19)

Examples of the alkyl group represented by each of $R^1$, $R^{11}$, $R^{12}$, $R^{13}$, and $R^{21}$ include methyl, ethyl, propyl, isopropyl, butyl, isobutyl, s-butyl, t-butyl, amyl, isoamyl, t-amyl, hexyl, heptyl, octyl, isooctyl, 2-ethylhexyl, t-octyl, nonyl, isononyl, decyl, isodecyl, undecyl, dodecyl, tetradecyl, hexadecyl, octadecyl, icosyl, cyclopentyl, cyclohexyl, cyclohexylmethyl, vinyl, allyl, butenyl, ethynyl, propynyl, methoxyethyl, ethoxyethyl, propoxyethyl, pentyloxyethyl, octyloxyethyl, methoxyethoxyethyl, ethoxyethoxyethyl, propoxyethoxyethyl, methoxypropyl and 2-methoxy-1-methylethyl.

Examples of the aryl group represented by each of $R^1$, $R^{11}$, $R^{12}$, $R^{13}$, and $R^{21}$ include phenyl, tolyl, xylyl, ethylphenyl, chlorophenyl, naphthyl, anthryl and phenanthrenyl, and phenyl, biphenyl, naphthyl and anthryl substituted with the alkyl group at at least one position.

Examples of the arylalkyl group represented by each of $R^1$, $R^{11}$, $R^{12}$, $R^{13}$, and $R^{21}$ include benzil, chlorobenzil, α-methylbenzil, α,α-dimethylbenzil, phenylethyl, and phenylethenyl.

Examples of the heterocyclic group represented by each of $R^1$, $R^{11}$, $R^{12}$, and $R^{13}$ include pyridyl, pyrimidyl, furyl, thienyl, tetrahydrofuryl, dioxolanyl, benzoxazol-2-yl, tetrahydropyranyl, pyrrolidyl, imidazolidyl, pyrazolidyl, thiazolidyl, isothiazolidyl, oxazolidyl, isooxazolidyl, piperidyl, piperazyl and morpholinyl. The heterocyclic ring is, for example, a 5- to 7-membered ring.

Examples of the halogen atom with which each of $R^1$ and $R^{21}$ can be substituted include fluorine, chlorine, bromine and iodine.

When Y represents a substituent represented by any one of chemical formulae (Y-1) to (Y-19), specific examples of the photopolymerization initiator represented by general formula (1) include compounds represented by the following chemical formulae (1-1) to (1-20).

[Formula 9]
(1-1) 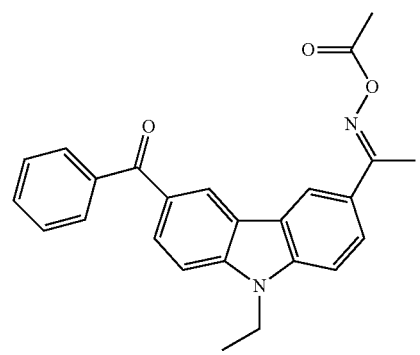
(1-2) 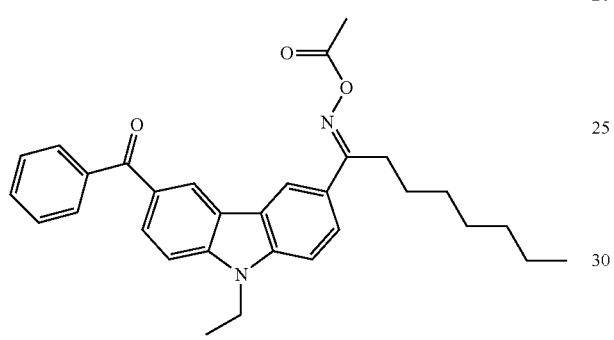
(1-3) 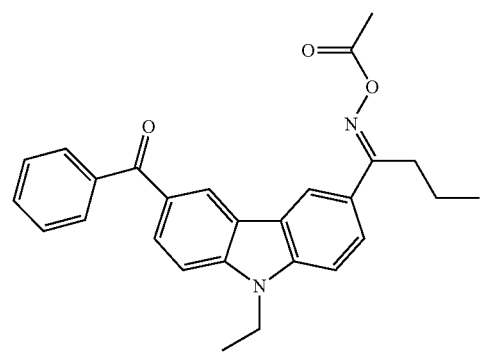
(1-4) 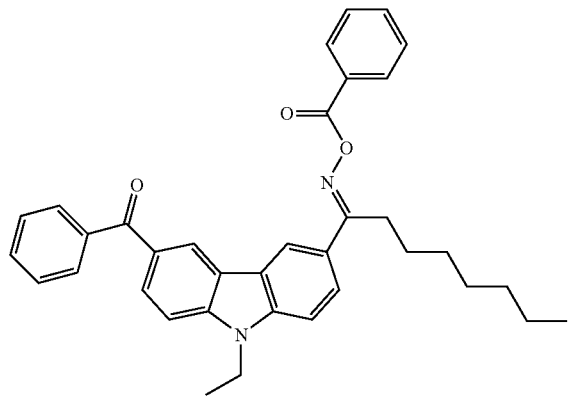
(1-5) 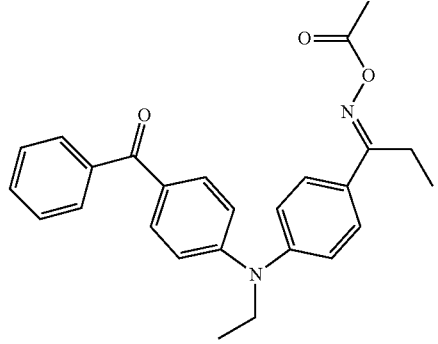
(1-6) 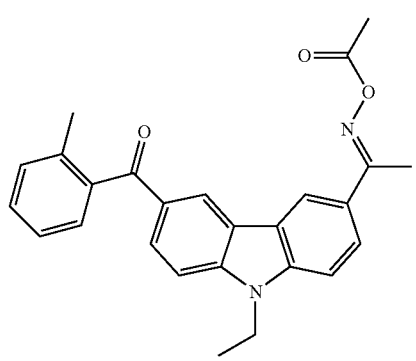
(1-7) 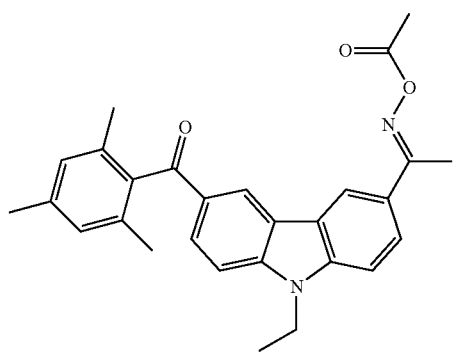
(1-8) 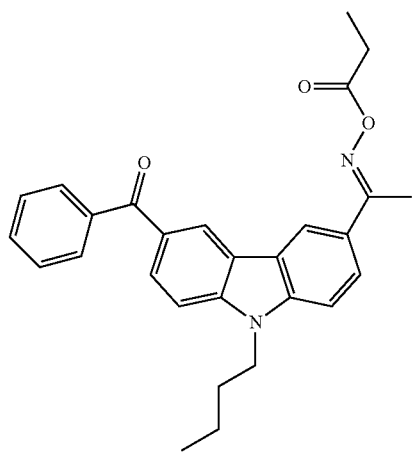

(1-9)
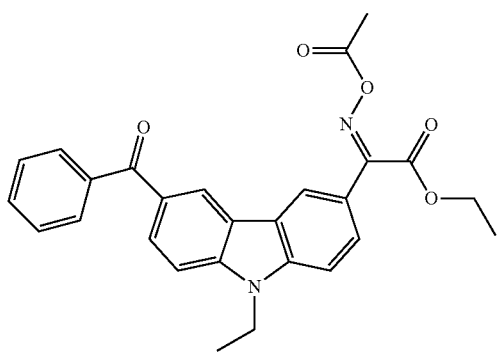
(1-10)
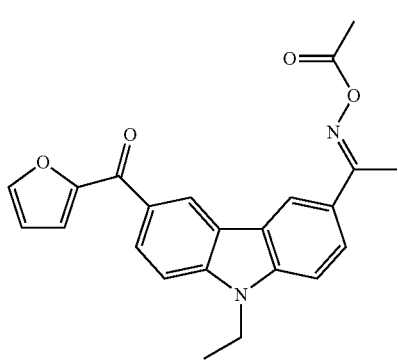
(1-11)
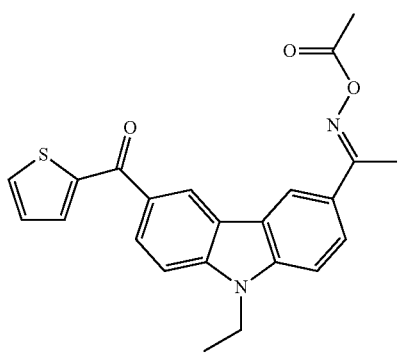
(1-12)
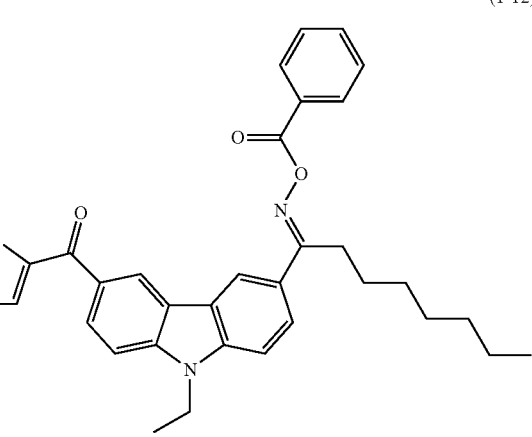
[Formula 10]
(1-13)
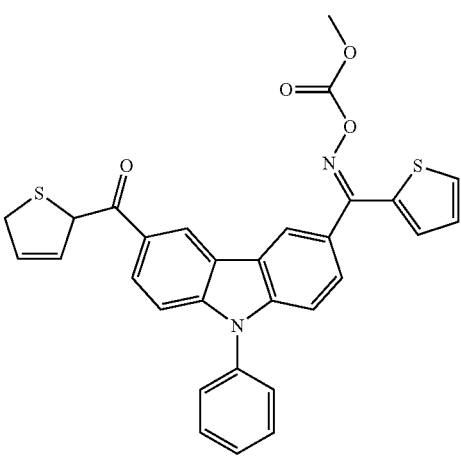
(1-14)
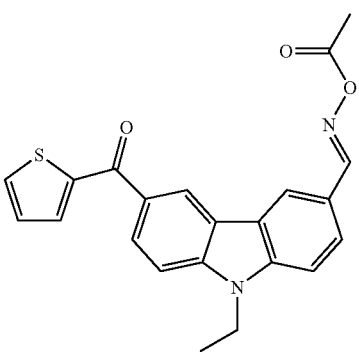
(1-15)
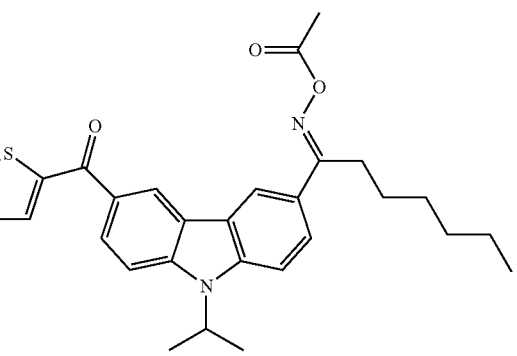
(1-16)
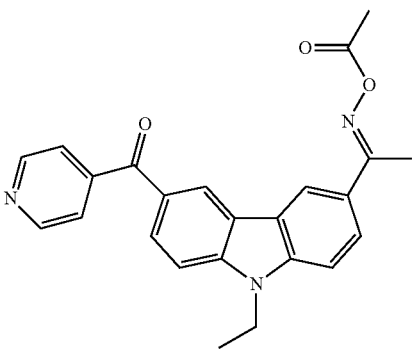

-continued (1-17)
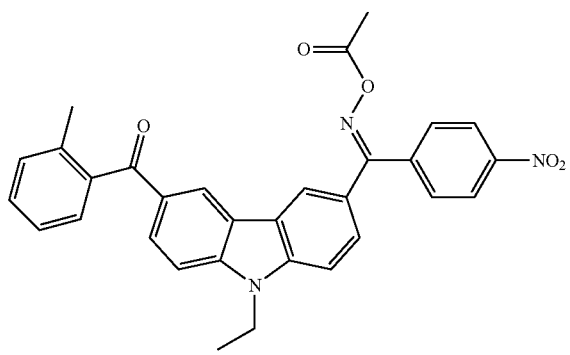

(1-18)
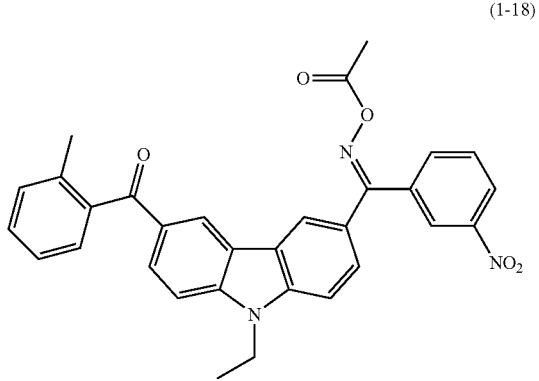

(1-19)
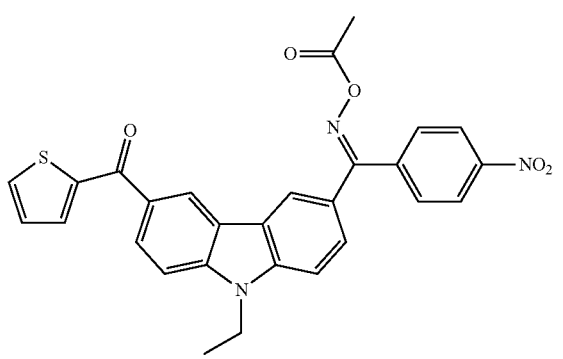

(1-20)
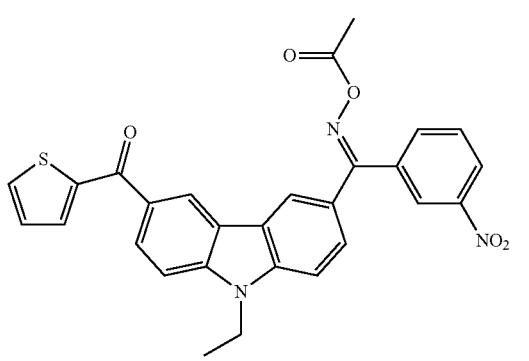

When Y represents a nitro group, examples of the photopolymerization initiator represented by general formula (1) include a compound represented by the following general formula (2). While the detail is described below, the substituent at the 7-position of the carbazole structure is preferably a nitro group as represented by general formula (2), from the viewpoint of an enhancement in cleaning property.

[Formula 11]

General formula (2)

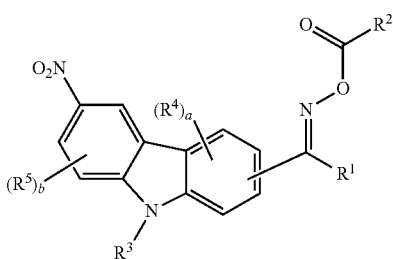

In general formula (2), $R^4$ and $R^5$ each independently represent $R^{11}$, $OR^{11}$, $SR^{11}$, $COR^{11}$, $CONR^{12}R^{13}$, $NR^{12}COR^{11}$, $OCOR^{11}$, $COOR^{11}$, $SCOR^{11}$, $OCSR^{11}$, $COSR^{11}$, $CSOR^{11}$, CN, a halogen atom or a hydroxyl group. Here, a and b each independently denote 0 to 3. Examples of the halogen atom represented by each of $R^4$ and $R^5$ include fluorine, chlorine, bromine and iodine.

Specific examples of the photopolymerization initiator represented by general formula (2) include compounds represented by the following chemical formulae (2-1) to (2-59).

[Formula 12]

(2-1)
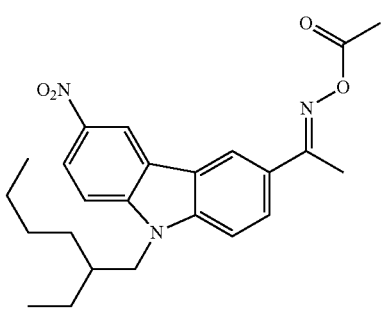

(2-2)
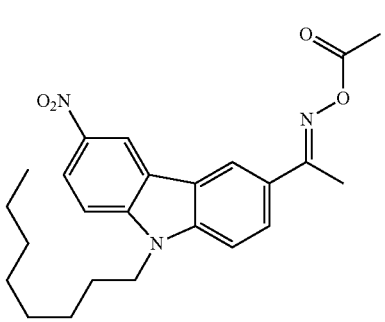

(2-3)
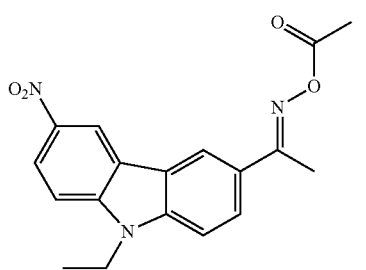
(2-4)
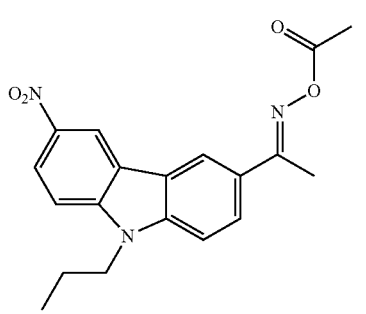
(2-5)
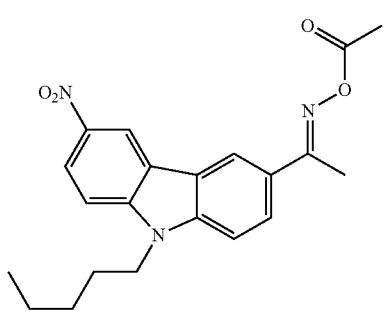
(2-6)
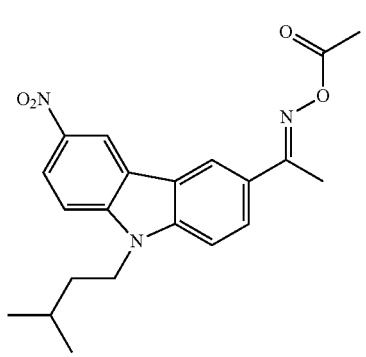
(2-7)
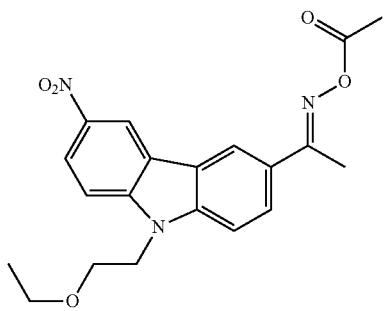
(2-8)
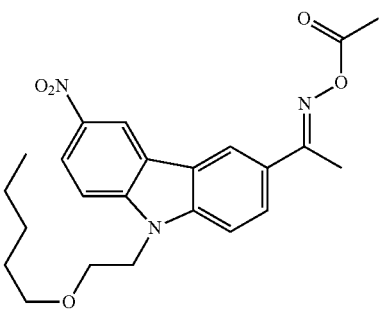
(2-9)
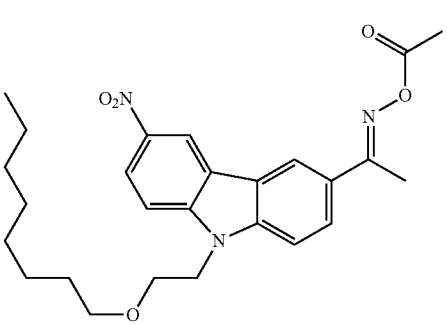
(2-10)
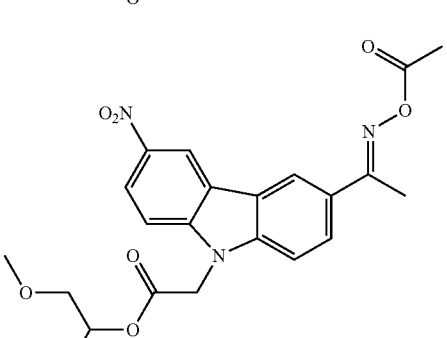
(2-11)
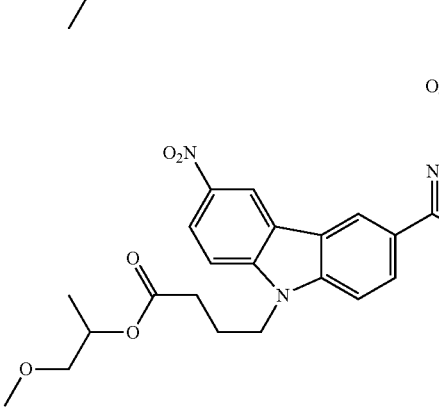
(2-12)
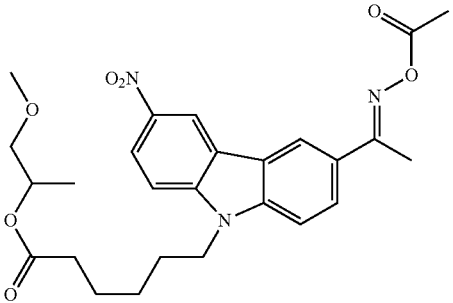

(2-13) 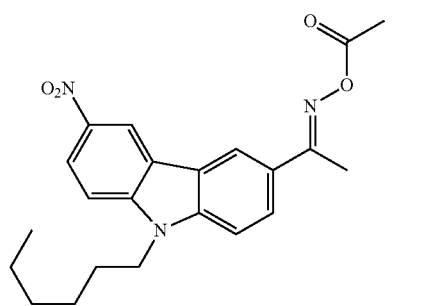
(2-14) 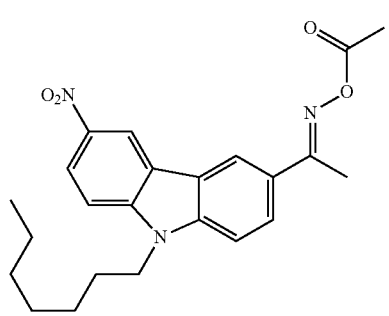
(2-15) 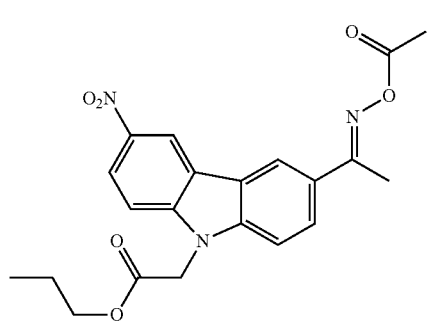
[Formula 13]
(2-16) 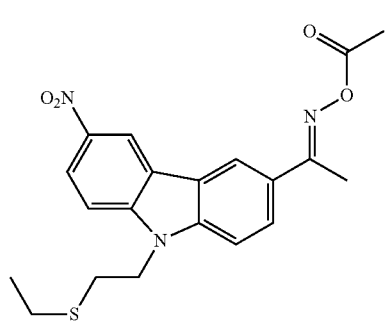
(2-17) 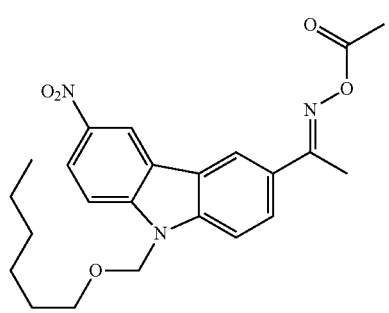
(2-18) 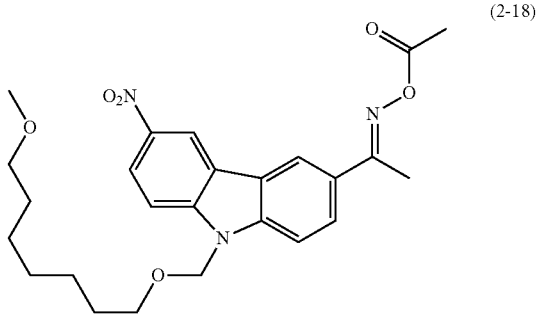
(2-19) 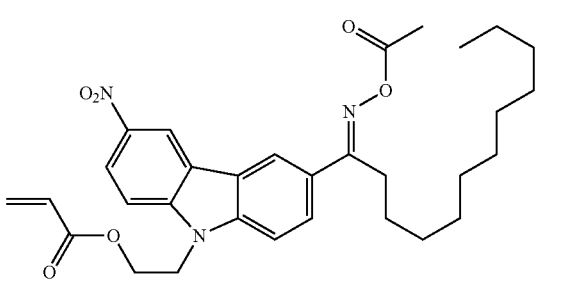
(2-20) 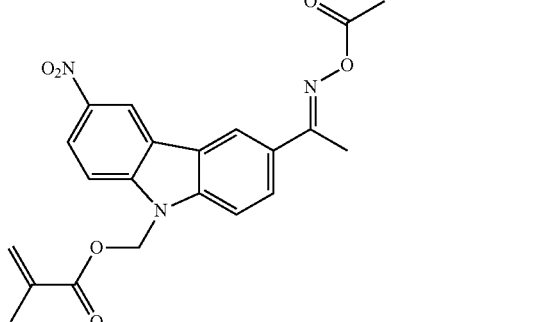
(2-21) 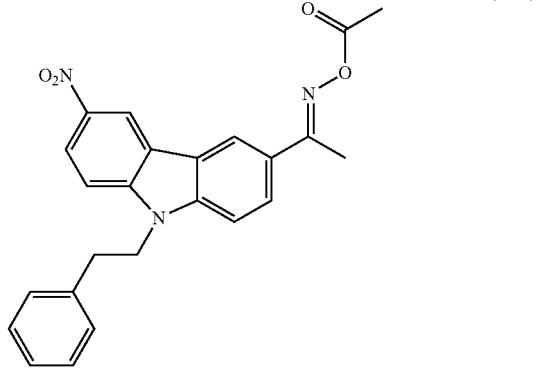
(2-22) 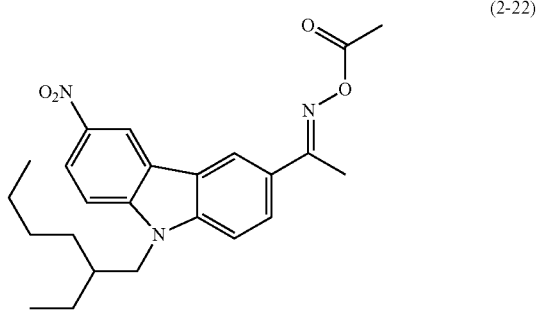

(2-23)
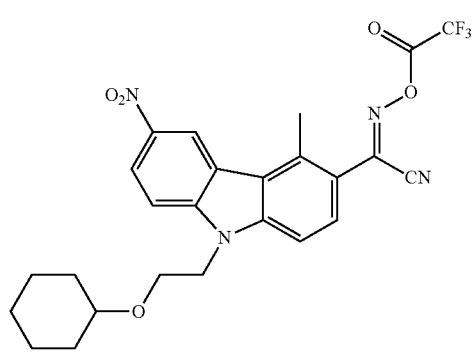
(2-27)
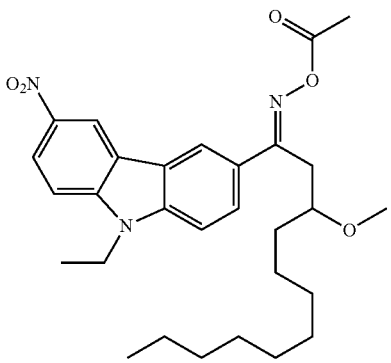
(2-24)
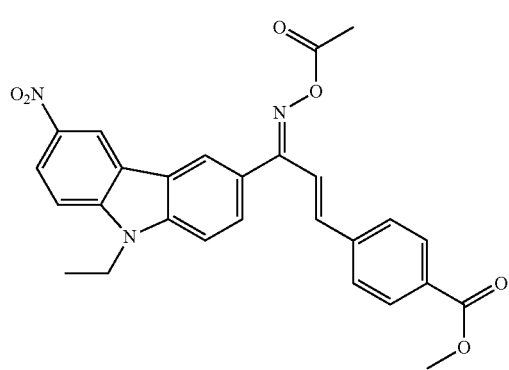
(2-28)
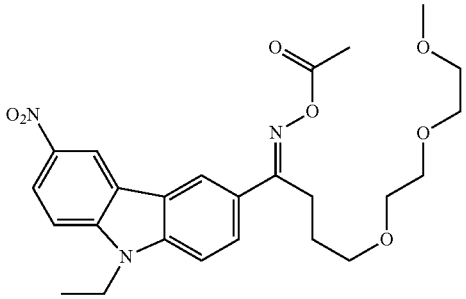
(2-25)
(2-29)
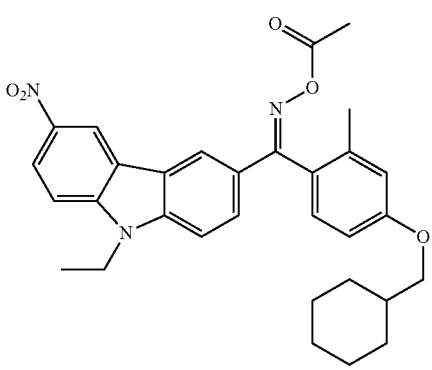
(2-26)
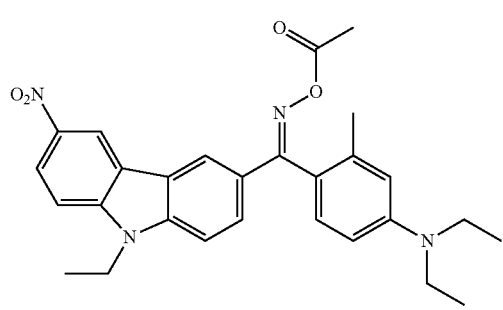
(2-30)

[Formula 14]
(2-31)
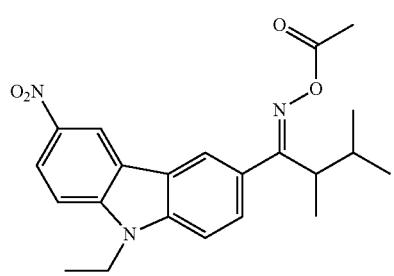
(2-32)
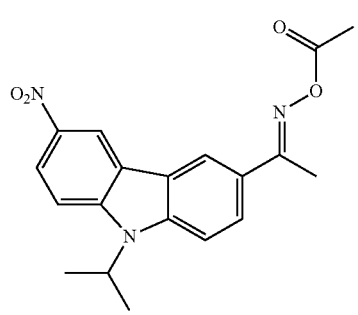
(2-33)
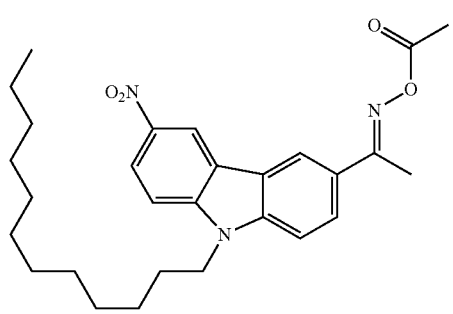
(2-34)
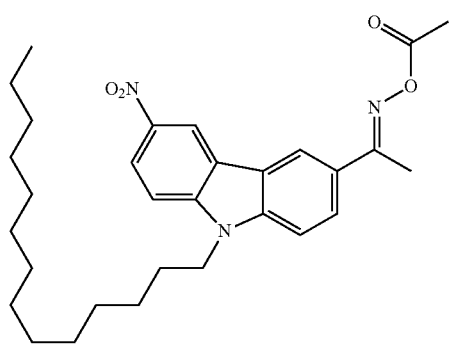
(2-35)
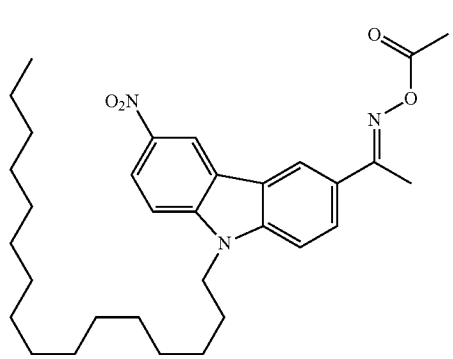
(2-36)
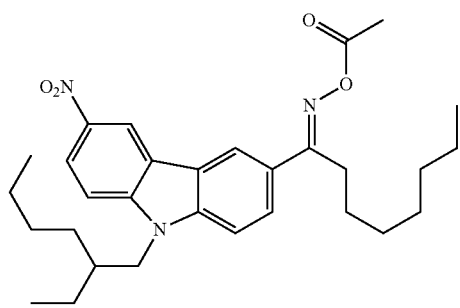
(2-37)
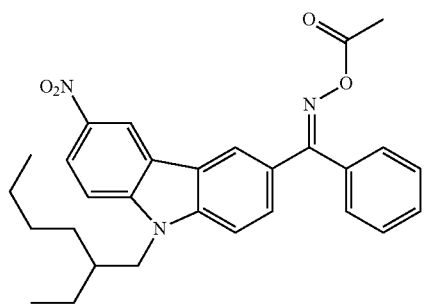
(2-38)
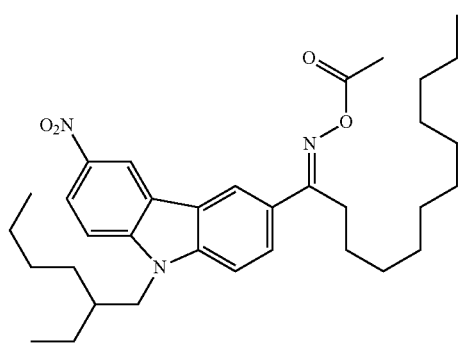
(2-39)
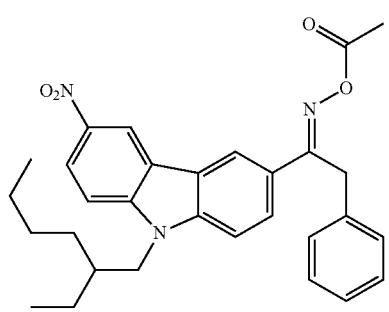
(2-40)
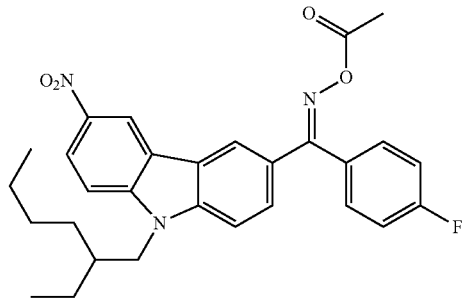

-continued
(2-41)
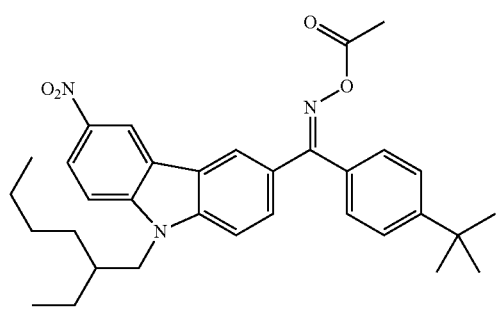
(2-42)
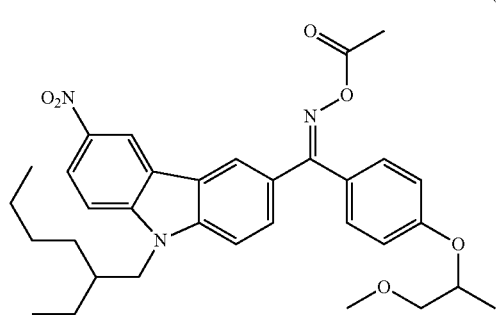
(2-43)
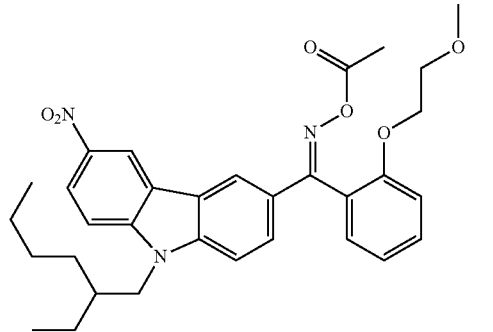
(2-44)
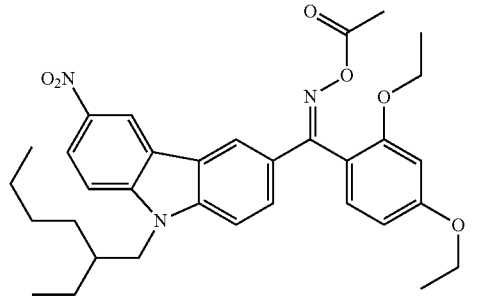
(2-45)
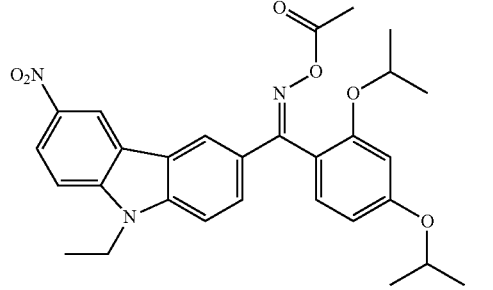
-continued
(2-46)
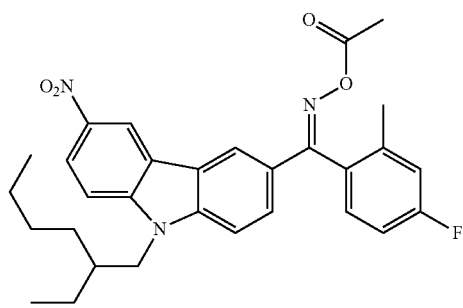
[Formula 15]
(2-47)
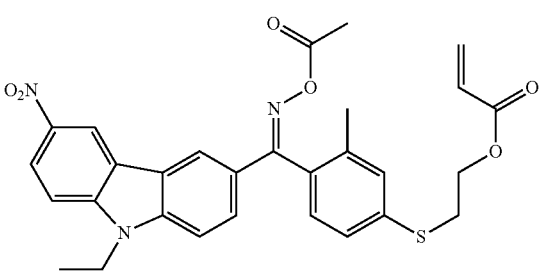
(2-48)
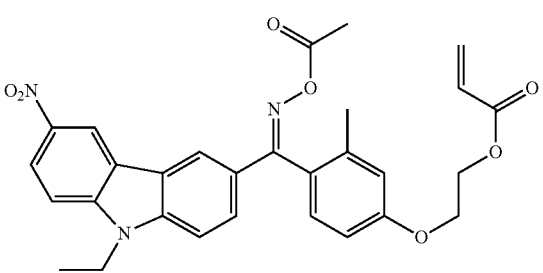
(2-49)
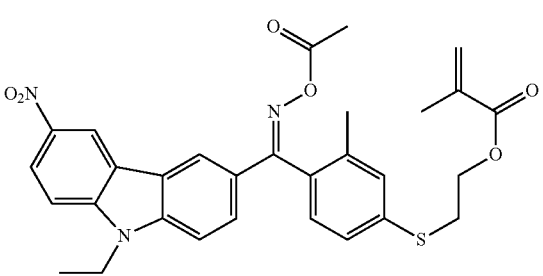
(2-50)
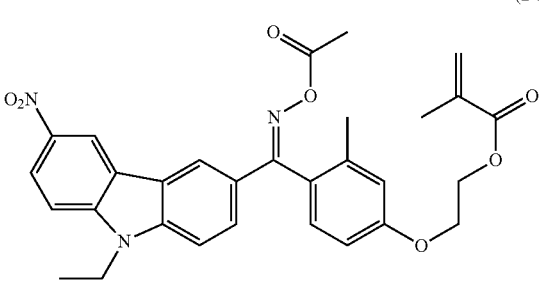

(2-51)
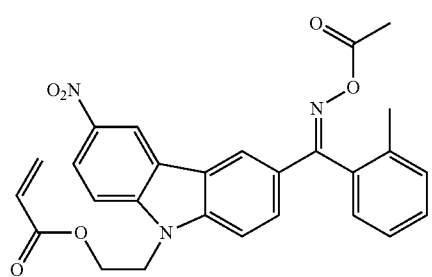

(2-52)
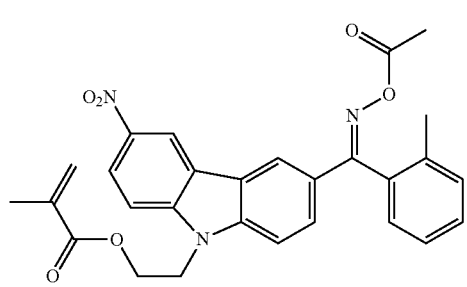

(2-53)
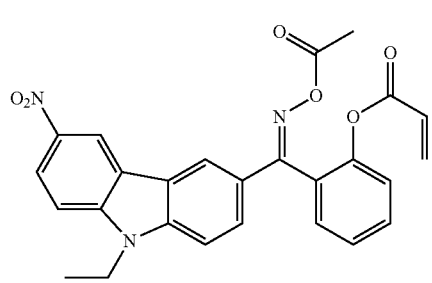

(2-54)
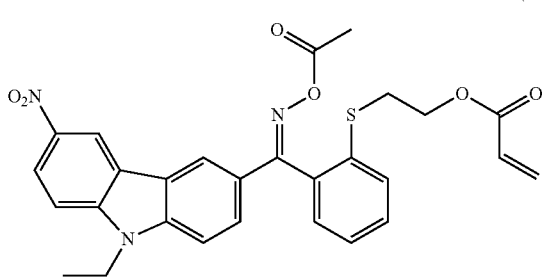

(2-55)
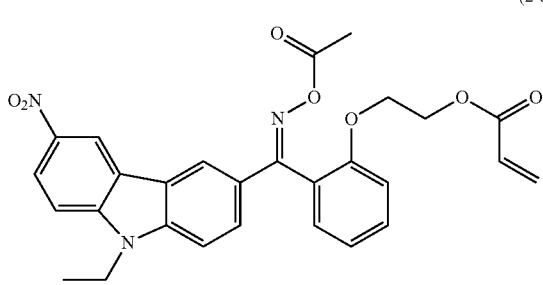

(2-56)
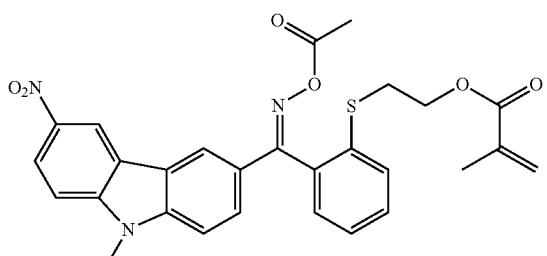

(2-57)
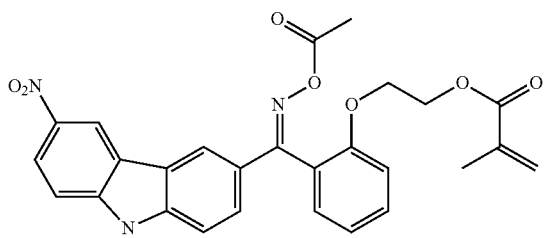

(2-58)
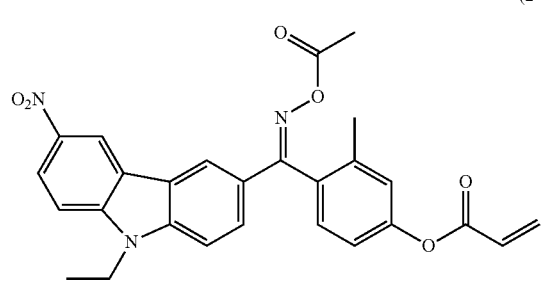

(2-59)
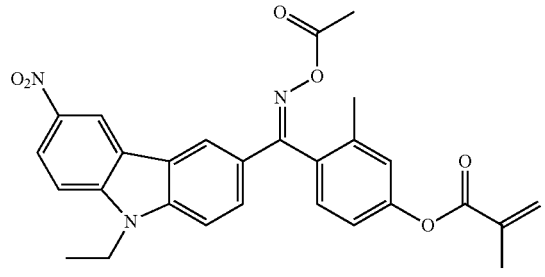

The photopolymerization initiator may be a synthetic compound or a commercial product. Examples of the commercial product of the photopolymerization initiator include IRGACURE OXE02 (produced by BASF SE, "IRGACURE" is a registered trademark of the Company).

Such a photopolymerization initiator may be used singly or in combinations thereof.

The photopolymerization initiator is produced by a known method for synthesizing an oxime ester compound. For example, the photopolymerization initiator is synthesized by a method represented by the following chemical reaction formula. First, nitrocarbazole compound 1 and acid chloride 2 are allowed to react with each other in the presence of aluminum chloride, thereby providing acyl compound 3. Next, acyl compound 3 obtained and hydroxylammonium chloride are allowed to react with each other in dimethylformamide (DMF), thereby providing acyl compound 4. Finally, acyl compound 4 obtained and acid anhydride are allowed to react with each other in the presence of triethylamine, thereby providing oxime ester-based photopolymerization initiator 5 having a carbazole structure.

[Formula 16]

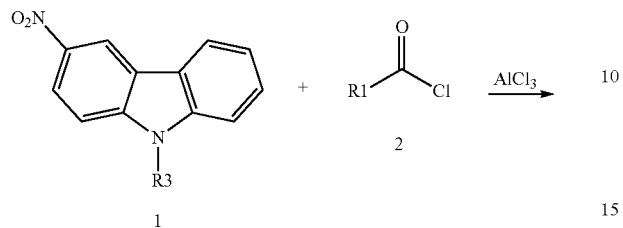

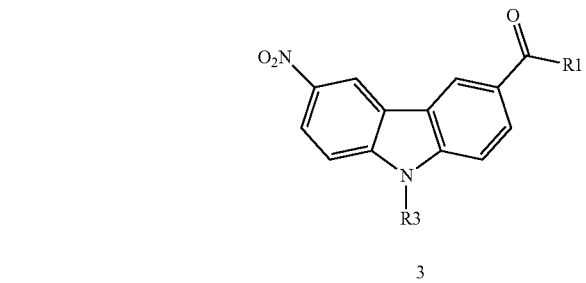

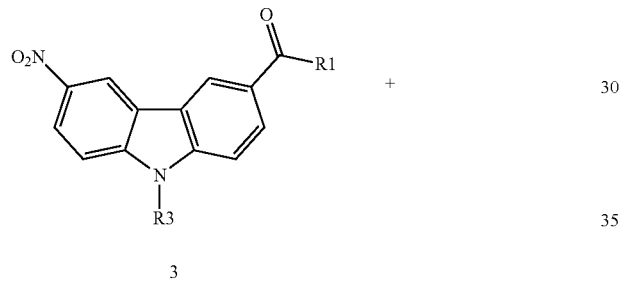

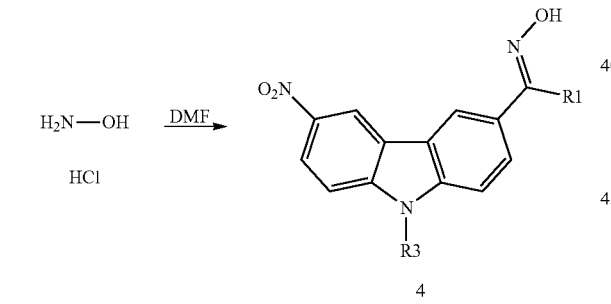

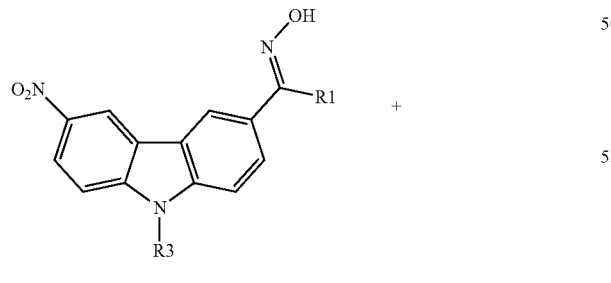

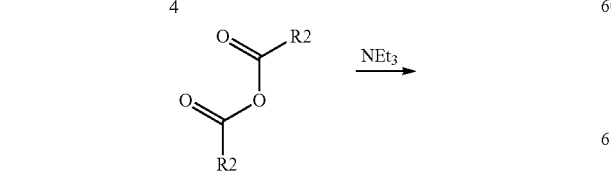

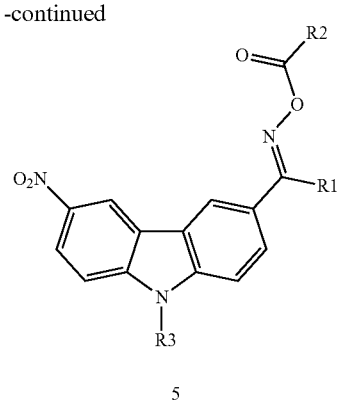

The photopolymerization initiator is also synthesized by a method represented by the following chemical reaction formula. First, carbazole compound 6 and acid chlorides 7 and 8 are allowed to react with one another in the presence of aluminum chloride, thereby providing acyl compound 9. Next, acyl compound 9 obtained and hydroxylammonium chloride are allowed to react with each other, thereby providing acyl compound 10. Finally, acyl compound 10 obtained and acid chloride 11 are allowed to react with each other in the presence of triethylamine, thereby providing oxime ester-based photopolymerization initiator 12 having a carbazole structure.

[Formula 17]

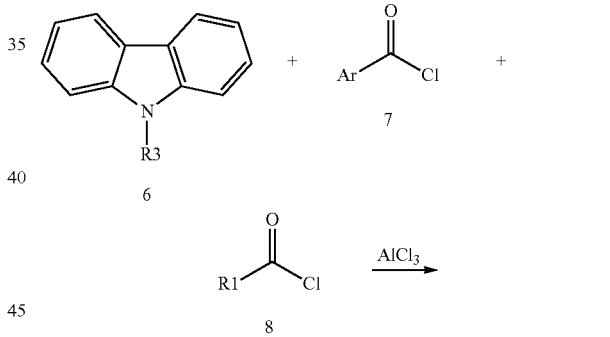

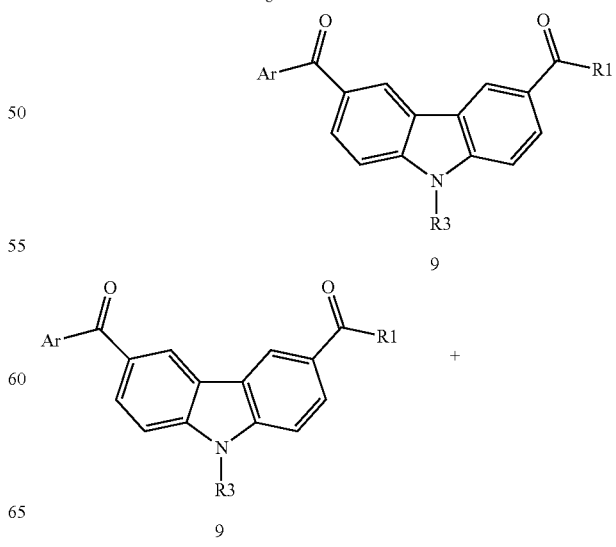

-continued

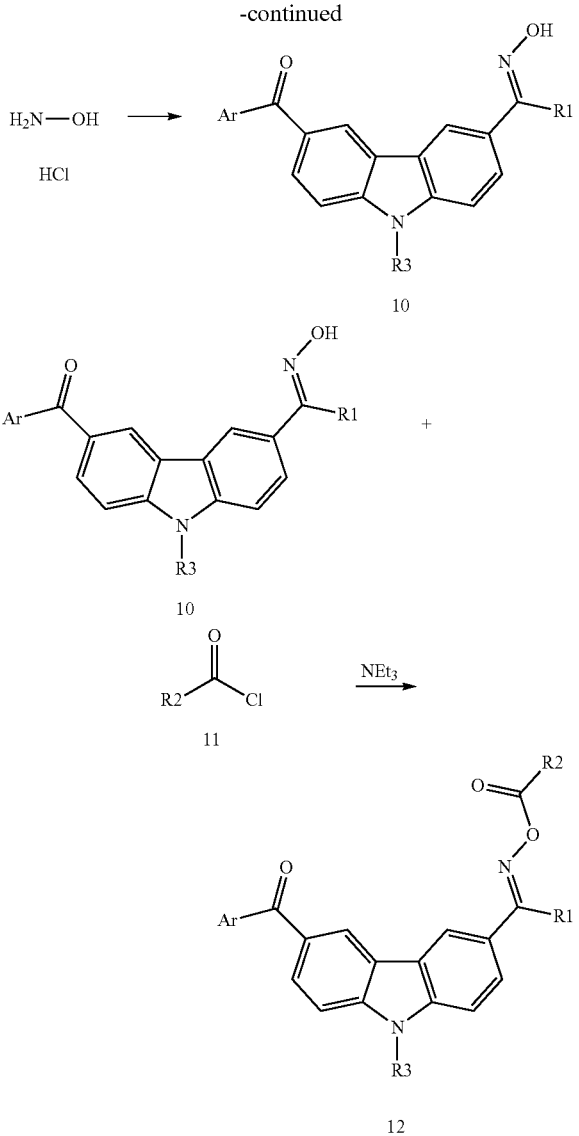

The photopolymerization initiator is irradiated with actinic radiation, thereby cleaving a N—O bond of an oxime ester moiety to produce a first radical having a carbazole structure and a second radical not having a carbazole structure (for example, $R^2COO$ radical and $R^2$ radical). In the present embodiment, it is considered that the second radical not having a carbazole structure mainly contributes to a polymerization reaction of a polymerizable monomer and the first radical having a carbazole structure hardly contributes to the polymerization reaction and is deactivated. The carbazole compound being a residue substance after deactivation of the first radical is contained in surface layer 16.

The presence of the carbazole compound contained in surface layer 16 can be confirmed by infrared spectroscopic analysis. Surface layer 16 has, for example, an absorption peak in the range from 1,610 to 1,635 cm$^{-1}$ in the infrared absorption spectrum. The peak originates from the carbazole structure of the photopolymerization initiator. That is, it can be presumed based on the infrared absorption spectrum of surface layer 16 that the photopolymerization initiator used is a photopolymerization initiator having a carbazole structure. The infrared spectroscopy spectrum is measured with, for example, an FT-IR spectrometer (manufactured by Thermo Fisher Scientific Inc.).

The content of the photopolymerization initiator is, for example, preferably 0.1 to 10 mass %, more preferably 0.1 to 5 mass % relative to the total amount of the resin solid. The "resin solid" here refers to a component present as a resin in the polymerized cured product (surface layer 16) after curing of the radical polymerizable composition, and corresponds to, for example, a radical polymerizable monomer to be polymerized in radical polymerization, and a resin to be added to the radical polymerizable composition.

The photopolymerization initiator is present in surface layer 16 with being mainly cleaved at the oxime ester moiety. The content of the carbazole compound derived from the photopolymerization initiator in surface layer 16 is, for example, 0.5 to 8 mass %. That is, use of an oxime ester-based compound having a carbazole structure as the photopolymerization initiator can be presumed based on the content of the carbazole compound in surface layer 16. The presence of the carbazole compound and the content thereof in surface layer 16 are measured by a known method such as nuclear magnetic resonance (NMR) and infrared spectroscopy (IR).

(Metal Oxide Particle Subjected to Surface Treatment)

The metal oxide particle subjected to surface treatment includes a metal oxide particle, and a substance for support, supported on the surface of the metal oxide particle. The metal oxide particle subjected to surface treatment imparts desired hardness, wear resistance and durability to surface layer 16. The "substance for support" here refers to a compound supported on the surface of the metal oxide particle, and the substance for support may be physically supported on or chemically bound to the surface of the metal oxide particle. For example, when the surface of the metal oxide particle is covered with a resin, the substance for support corresponds to the resin by itself. When the surface of the metal oxide particle is treated with a silane coupling agent, the substance for support corresponds to a component subjected to a reaction with the silane coupling agent.

The size and the content of the metal oxide particle are appropriately adjusted depending on the desired hardness, wear resistance and durability of surface layer 16. If the metal oxide particle is too small, wear resistance of surface layer 16 may be insufficient. If the metal oxide particle is too large, the metal oxide particle may be deteriorated in dispersibility and easily precipitated in the radical polymerizable composition, and the metal oxide particle may inhibit photo-curing, resulting in insufficient wear resistance of surface layer 16. The number average primary particle size of the metal oxide particle is, for example, 1 to 300 nm, preferably 3 to 100 nm, more preferably 10 to 50 nm from such viewpoints.

The number average primary particle size of the metal oxide fine particle is determined by taking an enlarged photograph with a scanning electron microscope (manufactured by JEOL Ltd.) at a magnification of 10,000-fold, and subjecting an image of 300 particles (excluding any particles aggregated) randomly taken by a scanner, to calculation with Software version Ver.1.32 of an automatic image processing analysis apparatus "LUZEX AP" (manufactured by Nireco).

The content of the metal oxide particle subjected to surface treatment in surface layer 16 is, for example, 10 to 60 parts by volume, preferably 20 to 50 parts by volume based on 100 parts by volume of the components other than the metal oxide particle subjected to surface treatment in surface layer 16.

Examples of the metal oxide that forms the metal oxide particle include silicon oxide (silica), magnesium oxide, zinc oxide, lead oxide, aluminum oxide (alumina), tantalum oxide, indium oxide, bismuth oxide, yttrium oxide, cobalt oxide, copper oxide, manganese oxide, selenium oxide, iron oxide, zirconium oxide, germanium oxide, tin oxide, titanium oxide (titania), niobium oxide, molybdenum oxide and vanadium oxide. The metal oxide that forms the metal oxide particle is preferably tin oxide or alumina. Such metal oxide particles may be used singly or in combinations thereof.

The type of the substance for support can be appropriately set depending on predetermined physical properties of surface layer 16 and the metal oxide particle. For example, the substance for support is a silicone-based surface treating agent or a compound having a perfluoroalkyl group from the viewpoint that the surface energy of the metal oxide particle is decreased to enhance dispersibility of the metal oxide particle.

Examples of the silicone-based surface treating agent include methyl hydrogen polysiloxane and modified silicone oil. Examples of the modified silicone oil include amino-modified silicone, epoxy-modified silicone, carbinol-modified silicone, mercapto-modified silicone and carboxyl-modified silicone. The weight average molecular weight of the silicone-based surface treating agent is, for example, preferably 300 to 20,000 from the viewpoints that a predetermined function is exhibited and handling in surface treatment is easy.

Examples of the compound having a perfluoroalkyl group include perfluoroalkyl (meth)acrylate, perfluoroalkylmethyl (meth)acrylate, 2-perfluoroalkylethyl (meth)acrylate, 3-perfluoroalkylpropyl (meth)acrylate, 3-perfluoroalkyl-1-methylpropyl (meth)acrylate and 3-perfluoroalkyl-2-propenyl (meth)acrylate.

The substance for support is preferably a compound having a radical polymerizable functional group from the viewpoint that flexibility of surface layer 16 is enhanced to impart desired cleaning property and transfer function. The radical polymerizable functional group of the radical polymerizable monomer and the radical polymerizable functional group of the substance for support may be the same as or different from each other. The radical polymerizable functional group of the substance for support is a reactive group having an unsaturated bond having reactivity, and is, for example, a (meth)acryloyl group. The metal oxide particle supports the substance for support having a radical polymerizable functional group, and thus the polymerized cured product that forms surface layer 16 has a molecular structure having a certain molecular chain length, with the metal oxide particle interposed. Thus, it is considered that surface layer 16 can follow deformation of intermediate transfer belt 10 in driving of intermediate transfer belt 10, resulting in suppression of the occurrence of cracking on surface layer 16 in driving of intermediate transfer belt 10, to result in enhancements in cleaning property and transfer function of toner.

Examples of the compound having a (meth)acryloyl group include a compound represented by the following general formula (3).

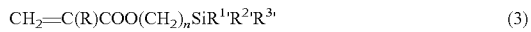

$$CH_2=C(R)COO(CH_2)_nSiR^{1'}R^{2'}R^{3'} \quad (3)$$

In general formula (3), R represents a hydrogen atom or a methyl group, and n represents an integer of 7 to 17. In terms of cleaning property and transfer function, n preferably represents 7 to 14, more preferably 8 to 13. $R^{1'}$, $R^{2'}$ and $R^{3'}$ each represent $CH_3$, $OCH_3$, $OC_2H_5$, or Cl. $R^{1'}$, $R^{2'}$ and $R^{3'}$ may be the same as or different from one another.

Specific examples of the substance for support represented by general formula (3) include 7-(meth)acryloxyheptyltrimethoxysilane, 8-(meth)acryloxyoctyltrimethoxysilane, 9-(meth)acryloxynonyltrimethoxysilane, 10-(meth)acryloxydecyltrimethoxysilane, 11-(meth)acryloxyundecyltrimethoxysane, 12-(meth)acryloxydodecyltrimethoxysilane, 13-(meth)acryloxytridecyltrimethoxysilane, 14-(meth)acryloxytetradecyltrimethoxysilane, 15-(meth)acryloxypentadecyltrimethoxysilane, 16-(meth)acryloxyhexadecyltrimethoxysilane and 17-(meth)acryloxyheptadecyltrimethoxysilane.

The substance for support may be produced or may be a commercial product. The method for producing the substance for support can be according to a known method (see, for example, Japanese Patent Application Laid-Open No. 5-306290). Such substances supported may be used singly or in combinations thereof.

The thickness of surface layer 16 can be appropriately adjusted depending on the desired flexibility and durability. The thickness of surface layer 16 is preferably 0.5 μm or more, more preferably 1 μm or more, further preferably 2 μm or more in terms of durability. The thickness of surface layer 16 is preferably 15 μm or less, more preferably 13 μm or less, further preferably 10 μm or less in terms of flexibility. The thickness of surface layer 16 is determined by, for example, cutting intermediate transfer belt 10 in the stacking direction of substrate layer 12 and surface layer 16 to provide cross sections, and measuring the thickness at each of the cross sections and/or calculating the average thereof.

Surface layer 16 may further contain other component as long as at least one of predetermined characteristics (for example, cleaning property, flexibility, durability, and adhesiveness) is achieved. Examples of such other component include tertiary amine and a vinyl copolymer.

In the present embodiment, the tertiary amine acts as a polymerization promoter. The tertiary amine is contained in the radical polymerizable composition, thereby promoting radical polymerization in formation of surface layer 16. While the detail is described below, the tertiary amine can be contained in the radical polymerizable composition, thereby enhancing cleaning property.

Examples of the tertiary amine include N,N-dimethylaniline, N,N-diethylaniline, N,N-di-n-butylaniline, N,N-dibenzylaniline, N,N-dimethyl-p-toluidine, N,N-diethyl-p-toluidine, N,N-dimethyl-m-toluidine, p-bromo-N,N-dimethylaniline, m-chloro-N,N-dimethylaniline, p-dimethylaminobenzaldehyde, p-dimethylaminoacetophenone, p-dimethylaminobenzoic acid, p-dimethylaminobenzoic acid ethyl ester, p-dimethylaminobenzoic acid amino ester, N,N-dimethyl anthranilic acid methyltoluidine, p-dimethylaminophenethyl alcohol, p-dimethylaminostilbene, N,N-dimethyl-3,5-xylidine, 4-dimethylaminopyridine, N,N-dimethyl-α-naphthylamine, N,N-dimethyl-β-naphthylamine, tributylamine, tripropylamine, triethylamine, N-methyldiethanolamine, N-ethyldiethanolamine, N,N-dimethylhexylamine, N,N-dimethyldodecylamine, N,N-dimethylstearylamine and N,N-dimethylaminoethanol.

The content of the tertiary amine is, for example, preferably 0.05 to 8 mass %, more preferably 1 to 4 mass % relative to the total amount of the resin solid.

Examples of the vinyl copolymer include vinyl acetate, styrene, acrylonitrile, and siloxane-based vinyl copolymers. The siloxane-based vinyl copolymer particularly preferably includes one or more polyorganosiloxane chains A and three or more radical polymerizable double bonds, from the viewpoints that filming on intermediate transfer belt 10 is prevented and that a low surface free energy of surface layer 16 is maintained.

The weight average molecular weight of the siloxane-based vinyl copolymer is preferably 5,000 to 100,000 from the viewpoint that compatibility of the siloxane-based vinyl copolymer in a coating solution for surface layer formation, described below, is enhanced.

When the siloxane-based vinyl copolymer and the metal oxide particle subjected to surface treatment in surface layer 16 are used in combination, the substance for support is preferably a silicone-based surface treating agent from the viewpoint that both the metal oxide particle subjected to surface treatment and the siloxane structure derived from the siloxane-based vinyl copolymer are dispersed in surface layer 16. The siloxane structure can be dispersed in surface layer 16, thereby allowing releasability due to the siloxane structure to be stably exhibited over a long period.

Intermediate transfer belt 10 may further have other layer as long as at least one of predetermined characteristics is achieved. Examples of such other layer include an elastic layer.

The elastic layer is a layer that has conductivity and elasticity and that is disposed between substrate layer 12 and surface layer 16. When intermediate transfer belt 10 further has an elastic layer, surface layer 16 is disposed on the elastic layer.

The elastic layer is configured by, for example, an elastic material such as rubber, an elastomer and a resin. Examples of the elastic material include chloroprene rubber (CR), nitrile/butadiene rubber (NBR), epichlorohydrin rubber (ECO) and urethane rubber (U). The elastic material is preferably chloroprene rubber or nitrile/butadiene rubber from the viewpoints of sufficient durability (ozone resistance and the like) against the environment in an image forming apparatus, sufficient mechanical strength for formation of an image, and proper control of the electric resistance of intermediate transfer belt 10.

The thickness of the elastic layer is preferably 100 to 500 μm from the viewpoint that at least one of predetermined functions (mechanical strength, image quality and production cost) of the elastic layer is exhibited. The thickness of the elastic layer can be determined by, for example, cutting intermediate transfer belt 10 in the stacking direction to provide cross sections, and measuring the thickness at each of the cross sections and/or calculating the average thereof.

The elastic layer may contain, if necessary, other component. Examples of such other component include a metal oxide particle and a conductive agent.

Examples of the metal oxide that forms the metal oxide particle in the elastic layer include aluminum oxide, aluminum hydroxide, magnesium oxide, magnesium hydroxide, zinc oxide, tin oxide, titanium oxide, silicon dioxide, potassium titanate, barium titanate, lead zirconate titanate (PZT), iron oxide, beryllium oxide, antimony oxide and calcium oxide.

The metal oxide particle may or may not be subjected to surface treatment. Examples of the surface treating agent include the above silicone-based surface treating agent.

The particle size of the metal oxide particle in the elastic layer can be appropriately modified from the viewpoint that at least one of desired characteristics is exhibited. On the other hand, if the particle size of the metal oxide particle is too small, handling, including dispersibility, may be made difficult. In general, as the particle size of the metal oxide particle is larger, handling tends to be easier. On the other hand, if the particle size of the metal oxide particle is too large, the surface roughness of the elastic layer may be increased. The particle size of the metal oxide particle is preferably 10 nm to 100 μm, more preferably 100 nm to 10 μm from such viewpoints. The particle size may be a representative value that defines the size of the metal oxide particle, and is, for example, the volume average particle size or the number average particle size.

The content of the metal oxide particle in the elastic layer can be appropriately modified depending on the thickness of the elastic layer, the particle size of the metal oxide particle, and the like. The content of the metal oxide particle in the elastic layer is, for example, 30 parts by weight or more based on 100 parts by weight of the resin that forms the elastic layer.

As the conductive agent, a known material that imparts conductivity to the resin material of intermediate transfer belt 10 is used. Examples of the conductive agent include an ion conductive agent and an electron conductive agent. Examples of the ion conductive agent include silver iodide, copper iodide, lithium perchlorate, lithium trifluoromethanesulfonate, a lithium salt of an organic boron complex, lithium bisimide $((CF_3SO_2)_2NLi)$ and lithium trismethide $((CF_3SO_2)_3CLi)$.

Examples of the electron conductive agent include metals such as silver, copper, aluminum, magnesium, nickel and stainless steel; and carbon compounds such as graphite, carbon black, carbon nanofiber and carbon nanotube. Such conductive agents may be used singly or in combinations thereof.

[Method for Producing Intermediate Transfer Belt]

Next, a method for producing intermediate transfer belt 10 according to the present embodiment is described. The method for producing intermediate transfer belt 10 includes a first step of forming a coating film of the radical polymerizable composition on substrate layer 12, and a second step of polymerizing the radical polymerizable monomer included in the radical polymerizable composition to form surface layer 16.

1) First Step

In the present step, a coating film of the radical polymerizable composition is formed on substrate layer 12. Specifically, substrate layer 12, and a radical polymerizable composition that forms surface layer 16 are produced, and substrate layer 12 is coated with the radical polymerizable composition produced.

An endless belt as substrate layer 12 is produced. Substrate layer 12 can be produced by a known method. For example, the step of forming substrate layer 12 includes heating a liquid film of polyamide acid with which the surface of a cylindrical base is coated, to imidate the polyamide acid, and recovering the resulting endless belt-shaped film as substrate layer 12 (see, for example, Japanese Patent Application Laid-Open No. 61-95361, Japanese Patent Application Laid-Open No. 64-22514, and Japanese Patent Application Laid-Open No. 3-180309).

Next, a radical polymerizable composition that forms surface layer 16 and that includes a radical polymerizable monomer having a (meth)acryloyl group, a photopolymerization initiator, and a metal oxide particle subjected to surface treatment is produced. In the present embodiment, an oxime ester-based photopolymerization initiator having a carbazole structure is used as the photopolymerization initiator.

First, the metal oxide particle subjected to surface treatment is prepared. The metal oxide particle subjected to surface treatment may be produced or may be a commercial product. For example, the metal oxide particle subjected to surface treatment can be produced according to the following method.

First, 0.1 to 200 parts by volume of a substance for support and 50 to 5,000 parts by volume of a solvent based on 100 parts by volume of the metal oxide particle are mixed, and dispersed by use of a wet media dispersion type apparatus. Thus, a dispersion liquid of the metal oxide particle subjected to surface treatment is obtained. Next, the solvent is removed from the dispersion liquid of the metal oxide particle, and thus the metal oxide particle subjected to surface treatment is obtained.

The wet media dispersion type apparatus is an apparatus in which beads as media are packed in a container and furthermore a stirring disc mounted perpendicular to a rotation axis is rotated at high speeds to thereby pulverize and disperse an aggregate of the metal oxide particle. Examples of the wet media dispersion type apparatus include a sand mill, an ultra visco mill, a pearl mill, a grain mill, a dyno mill, an agitator mill and a dynamic mill.

Examples of the material of the beads include glass, alumina, zircon, zirconia, steel and flint stone. The size of the beads is usually about 1 to 2 mm in diameter, and the size of the beads for use in the present embodiment is about 0.1 to 1.0 mm in diameter.

Examples of the materials of the container and the disc include stainless steel, nylon and ceramic. In the present embodiment, the materials of the container and the disc are preferably ceramics such as zirconia and silicon carbide.

Next, the radical polymerizable monomer, the photopolymerization initiator, and the metal oxide particle are dissolved or dispersed in a solvent so that the solid concentration is 10 mass %, thereby preparing a radical polymerizable composition. The content of the solvent in the radical polymerizable composition can be here any content as long as the radical polymerizable monomer, the photopolymerization initiator, and the metal oxide particle can be dissolved or uniformly dispersed, and the content can be appropriately adjusted in terms of coatability in formation of the coating film. The radical polymerizable composition may contain, if necessary, other component such as tertiary amine and a surface tension regulator.

The content of the photopolymerization initiator in the radical polymerizable composition is, for example, 0.1 to 10 mass %, preferably 0.1 to 5 mass % based on the total amount of the radical polymerizable composition. The content of the metal oxide particle subjected to surface treatment in the radical polymerizable composition is, for example, 10 to 60 parts by volume, preferably 20 to 50 parts by volume based on 100 parts by volume of the polymerizable monomer.

Examples of the solvent include methanol, ethanol, n-propyl alcohol, isopropyl alcohol, n-butanol, t-butanol, s-butanol, benzyl alcohol, toluene, xylene, methylene chloride, methyl ethyl ketone, methyl isobutyl ketone, cyclohexane, ethyl acetate, butyl acetate, methyl cellosolve, ethyl cellosolve, tetrahydrofuran, 1-dioxane, 1,3-dioxolan, pyridine and diethylamine. Such solvents may be used singly or in combinations thereof.

Next, substrate layer 12 is coated with the produced radical polymerizable composition for forming surface layer 16. The method for coating substrate layer 12 with the radical polymerizable composition can be, if necessary, appropriately selected from known methods. Examples of the coating method include a dip coating method (dipping coating method) and a spray coating method.

When substrate layer 12 is coated with the radical polymerizable composition by a dip coating method, the speed of pulling-up of substrate layer 12 from the radical polymerizable composition is appropriately adjusted depending on the viscosity of the radical polymerizable composition. For example, when the viscosity of the radical polymerizable composition is 1 to 200 mPa·sec, the pulling-up speed of substrate layer 12 is preferably 0.5 to 15 mm/sec in terms of uniformity of the coating film, and the thickness and the drying condition of the coating film.

2) Second Step

In the present step, surface layer 16 is formed. Specifically, the coating film formed on substrate layer 12 in the first step is irradiated with actinic radiation, to polymerize the radical polymerizable monomer included in the radical polymerizable composition.

The coating film may be dried in advance before polymerization of the radical polymerizable monomer. Thus, a curing reaction described below can be allowed to efficiently progress. The method for drying the coating film is appropriately selected from, for example, known drying methods. Examples of the method for drying the liquid film include, in addition to natural drying, thermal drying by a heating apparatus such as a halogen heater, an infrared heater or a hot air heater. The heating temperature can be appropriately adjusted depending on the type of the radical polymerizable monomer. The heating temperature is, for example, 40 to 100° C., preferably 40 to 80° C., more preferably 40 to 60° C.

The coating film formed on substrate layer 12 can be irradiated with actinic radiation, thereby allowing the radical polymerizable functional group of the radical polymerizable monomer in the coating film and the radical polymerizable functional group of the metal oxide particle subjected to surface treatment to be radically polymerized, to form surface layer 16. For example, while endless belt-shaped substrate layer 12 is moved along an endless orbital, substrate layer 12 is irradiated with actinic radiation. The speed of movement (circumferential speed) of substrate layer 12 is here preferably 10 to 300 mm/sec from the viewpoints of prevention of the variation in curing of the coating film, and optimization of the hardness after curing, the curing time, the speed of curing, and the like.

The conditions of irradiation with actinic radiation are appropriately adjusted from the viewpoints of prevention of the variation in curing of the coating film, and optimization of the hardness after curing, the curing time, the speed of curing, and the like. The amount of irradiation of actinic radiation is, for example, 0.5 to 10 $J/cm^2$, preferably 1 to 6 $J/cm^2$, more preferably 1 to 4 $J/cm^2$. The amount of irradiation can be measured by, for example, UIT250 (manufactured by USHIO Inc.). Irradiation of the coating film with actinic radiation can be conducted by an irradiation apparatus having a light source that emits actinic light. The illuminance of actinic radiation is, for example, 40 to 200 $mW/cm^2$, preferably 60 to 200 $mW/cm^2$, more preferably 100 to 200 $mW/cm^2$.

Examples of the actinic radiation include ultraviolet light, electron beam and γ-ray. The actinic radiation is preferably ultraviolet light or electron beam, and is, for example, preferably ultraviolet light in terms of simplicity of handling. Examples of the source of ultraviolet light include a low-pressure mercury lamp, a medium-pressure mercury lamp, a high-pressure mercury lamp, an ultrahigh-pressure mercury lamp, a carbon-arc lamp, a metal halide lamp, a xenon lamp, an ArF excimer laser, a KrF excimer laser, an excimer lamp, and an apparatus that generates synchrotron radiation. The ultraviolet light is, for example, ultraviolet light having a wavelength of 400 nm or less.

Examples of the irradiation source of the electron beam include Cockcroft-Walton type, Van de Graff type, resonant transformer type, insulated core transformer type, linear type, dynamitron type, and radio-frequency type electron beam accelerators. Examples of the electron beam include electron beam having an energy of 50 to 1,000 keV, preferably 100 to 300 keV.

The irradiation time of the actinic radiation can be appropriately adjusted in terms of curing efficiency of the liquid film, work efficiency, and the like. The irradiation time is preferably 0.5 seconds to 5 minutes, more preferably 3 seconds to 2 minutes.

The concentration of oxygen in the atmosphere in the irradiation with actinic radiation is preferably 5 vol % or less, more preferably 1 vol % or less from the viewpoint that oxidation of surface layer 16 formed is prevented. The oxygen concentration is adjusted by feeding of other gas such as nitrogen gas into the atmosphere. The oxygen concentration can be measured by an oxygen concentration meter OX100 (manufactured by Yokogawa Electric Company) for management of atmosphere gas.

Intermediate transfer belt 10 according to the present embodiment can be produced by the above production method. Surface layer 16 of intermediate transfer belt 10 is configured by a polymerized cured product of the radical polymerizable composition including the radical polymerizable monomer having a (meth)acryloyl group, the photopolymerization initiator, and the metal oxide particle subjected to surface treatment having a radical polymerizable functional group ((meth)acryloyl group in the present embodiment). Thus, both hardness and flexibility to be demanded for an intermediate transfer belt can be satisfied.

The photopolymerization initiator included in the radical polymerizable composition is an oxime ester-based photopolymerization initiator having a carbazole structure. The photopolymerization initiator has a high absorbance coefficient, and can enhance reactivity of the radical polymerizable functional group in the radical polymerizable composition. Therefore, the amount of the residue substance that is generated from the photopolymerization initiator and that originates from the unreacted component of the second radical not having a carbazole structure, in the polymerized cured product of the radical polymerizable composition, can be reduced. While the detail is described below, the amount of the residue substance can be reduced, thereby resulting in an enhancement in cleaning property of intermediate transfer belt 10 and an enhancement in wear resistance of surface layer 16. It is preferable from the viewpoints of an enhancement in reactivity of the photopolymerization initiator and an enhancement in cleaning property of intermediate transfer belt 10 that the substituent at the 7-position of the carbazole structure of the photopolymerization initiator be a nitro group and the tertiary amine acting as the polymerization promoter be contained in the radical polymerizable composition.

As described above, intermediate transfer belt 10 according to the present embodiment can achieve high durability due to high wear resistance of surface layer 16. Therefore, intermediate transfer belt 10 is suitably used as an intermediate transfer belt in an electrophotographic image forming apparatus such as a copier, a printer, and a facsimile machine.

[Image Forming Apparatus]

An image forming apparatus according to the present embodiment includes an intermediate transfer belt that transfers a toner image formed on a photoconductor to a recording medium, and a cleaning member that has elasticity and that abuts with the intermediate transfer belt to remove an attachment on the intermediate transfer belt. Examples of the recording medium here include normal paper including thin paper and heavy paper, print sheets including art paper and coated paper, Japanese paper, a card sheet, a plastic film for OHP, and a cloth.

The image forming apparatus according to the present embodiment is formed in the same manner as in a known image forming apparatus including an intermediate transfer belt, except that intermediate transfer belt 10 according to the present embodiment is adopted. The image forming apparatus according to the present embodiment includes, for example, a photoconductor, a charging device that charges the photoconductor, an exposing device that irradiates the photoconductor charged, with light, to form an electrostatic latent image, a developing device that feeds toner to the photoconductor on which the electrostatic latent image is formed, to form a toner image corresponding to the electrostatic latent image, a transfer device including an intermediate transfer belt that transfers the toner image formed corresponding to the electrostatic latent image, to a recording medium, a fixing device that fixes the toner image to the recording medium, and a cleaning device that removes an attachment on the intermediate transfer belt. The "toner image" refers to toner collected in the form of an image.

Figure 2:
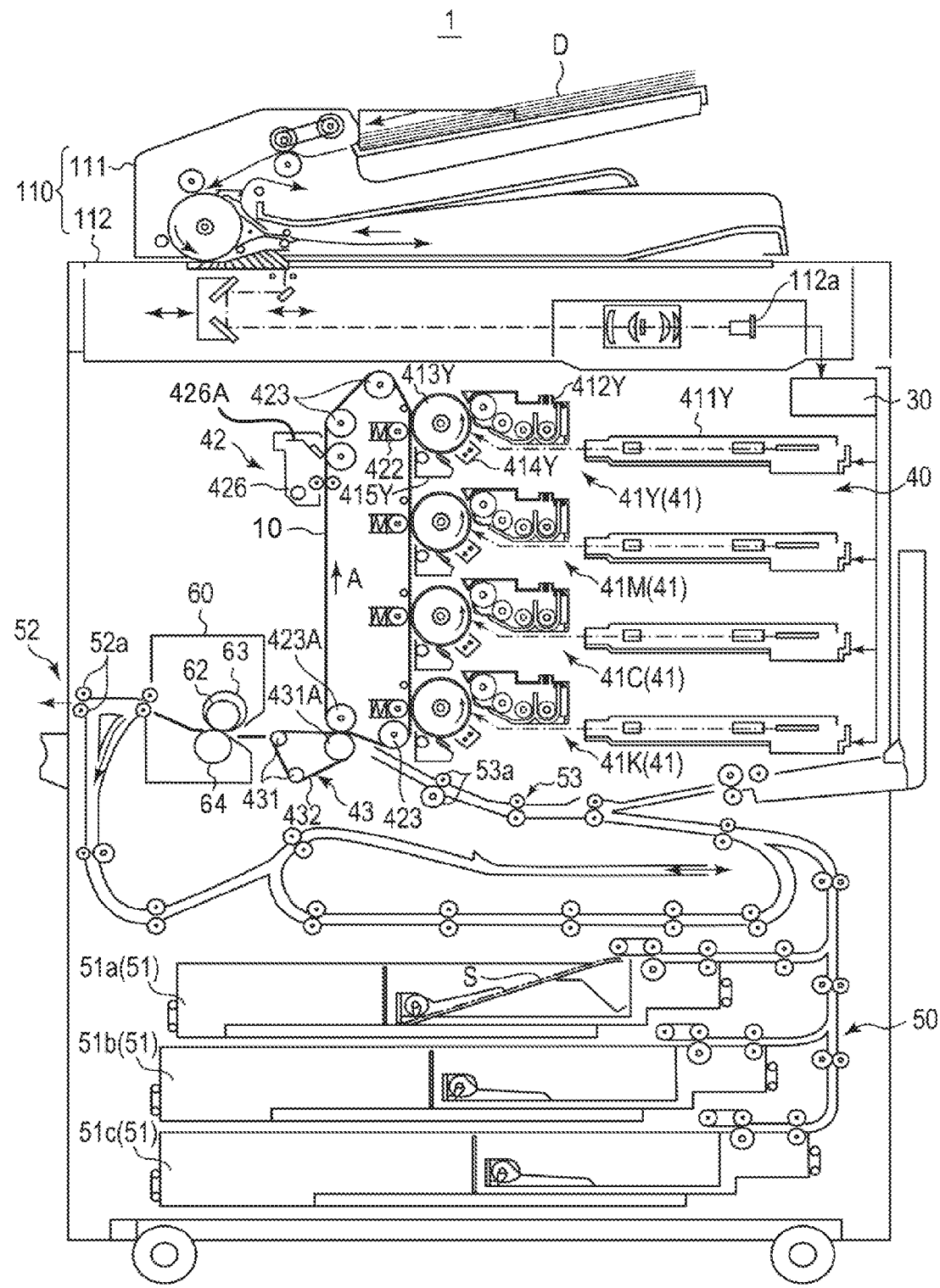
FIG. 2 schematically illustrates a configuration of the image forming apparatus of the present invention.

FIG. 2 schematically illustrates a configuration of an image forming apparatus according to one embodiment of the present invention. As illustrated in FIG. 2, image forming apparatus 1 includes image reading section 110, image processing section 30, image forming section 40, sheet conveying section 50 and fixing device 60.

Image forming section 40 includes image forming units 41Y, 41M, 41C and 41K that form an image with toners of respective colors Y (yellow), M (magenta), C (cyan) and K (black). All these units have the same configuration except for toner to be accommodated, and therefore respective symbols representing the colors may be omitted hereinafter. Image forming section 40 further includes intermediate transfer unit 42 and secondary transfer unit 43. Such units correspond to the transfer device.

Image forming unit 41 includes exposing device 411, developing device 412, photoconductor drum 413, charging device 414 and drum cleaning device 415. Photoconductor drum 413 is, for example, a negative charge type organic photoconductor. The surface of photoconductor drum 413 has photoconductivity. Photoconductor drum 413 corresponds to the photoconductor.

Charging device 414 is, for example, a corona charging device. Charging device 414 may be a contact charging device in which charging is made by bringing a contact charging member such as a charging roller, a charging brush or a charging blade into contact with photoconductor drum 413. Exposing device 411 is configured by, for example, a semiconductor laser. Developing device 412 is, for example, a developing device of a two-component development system.

Intermediate transfer unit 42 includes intermediate transfer belt 10 described above, primary transfer roller 422 that allows intermediate transfer belt 10 to be in pressure contact with photoconductor drum 413, a plurality of support rollers 423 including backup roller 423A, and belt cleaning device 426 including cleaning member 426A.

Intermediate transfer belt 10 is laid on a plurality of support rollers 423 in a tensioned state so as to have a loop shape. A driving roller as at least one of a plurality of support rollers 423 is rotated to thereby allow intermediate transfer belt 10 to be travelled in the direction of arrow A at a constant speed.

Secondary transfer unit 43 includes endless secondary transfer belt 432, and a plurality of support rollers 431 including secondary transfer roller 431A. Secondary transfer belt 432 is laid on secondary transfer roller 431A and support rollers 431 in a tensioned state so as to have a loop shape.

Fixing device 60 includes fixing roller 62, endless heat generation belt 63 that covers the outer peripheral surface of fixing roller 62 and that heats and melts toner forming a toner image on sheet S, and pressure roller 64 that presses sheet S towards fixing roller 62 and heat generation belt 63. Sheet S corresponds to the recording medium.

Image forming apparatus 1 further includes image reading section 110, image processing section 30 and sheet conveying section 50. Image reading section 110 includes sheet feeder 111 and scanner 112. Sheet conveying section 50 includes sheet feed section 51, sheet ejection section 52, and conveyance path section 53. Three sheet feed tray units 51a to 51c that form sheet feed section 51 accommodate sheets S (standard sheet, special sheet) identified based on the basis weight, the size, and the like with respect to each type set in advance. Conveyance path section 53 includes a plurality of conveyance roller pairs such as resist roller pair 53a.

Hereinafter, formation of an image by image forming apparatus 1 is described.

Scanner 112 optically scans document D on contact glass and reads it. Light reflected from document D is read by CCD sensor 112a, and formed into input image data. The input image data is subjected to predetermined image processing in image processing section 30, and transmitted to exposing device 411.

Photoconductor drum 413 is rotated at a constant circumferential speed. Charging device 414 evenly charges negatively the surface of photoconductor drum 413. Exposing device 411 irradiates photoconductor drum 413 with laser light according to the input image data of each color component. Thus, an electrostatic latent image is formed on the surface of photoconductor drum 413. Developing device 412 allows toner to be attached to the surface of photoconductor drum 413, thereby visualizing the electrostatic latent image. Thus, a toner image corresponding to the electrostatic latent image is formed on the surface of photoconductor drum 413.

The toner image on the surface of photoconductor drum 413 is transferred to intermediate transfer belt 10 by intermediate transfer unit 42. The transfer residual toner remaining on the surface of photoconductor drum 413 after transfer is removed by drum cleaning device 415 having a drum cleaning blade to be in sliding contact with the surface of photoconductor drum 413.

Intermediate transfer belt 10 is in pressure contact with photoconductor drum 413 by primary transfer roller 422, thereby forming a primary transfer nip by photoconductor drum 413 and intermediate transfer belt 10 with respect to each photoconductor drum. The toner image of each color is sequentially stacked on and transferred to intermediate transfer belt 10 in the primary transfer nip.

On the other hand, secondary transfer roller 431A is in pressure contact with backup roller 423A with intermediate transfer belt 10 and secondary transfer belt 432 interposed. Thus, a secondary transfer nip is formed by intermediate transfer belt 10 and secondary transfer belt 432. Sheet S passes through the secondary transfer nip. Sheet S is conveyed by sheet conveying section 50 to the secondary transfer nip. The inclination of sheet S is corrected and the timing of conveyance thereof is adjusted by a resist roller section where resist roller pair 53a is disposed.

Sheet S is conveyed to the secondary transfer nip, and thus transfer bias is applied to secondary transfer roller 431A. Such application of transfer bias allows the toner image supported on intermediate transfer belt 10 to be transferred to sheet S. Sheet S to which the toner image is transferred is conveyed by secondary transfer belt 432 towards fixing device 60.

Fixing device 60 allows a fixation nip to be formed by heat generation belt 63 and pressure roller 64, and heats and pressurizes sheet S conveyed, in the fixation nip section. Thus, the toner image is fixed to sheet S. Sheet S to which the toner image is fixed is ejected out of the apparatus by sheet ejection section 52 provided with sheet ejection roller 52a.

Belt cleaning device 426 includes cleaning member 426A having elasticity. Cleaning member 426A abuts with the surface of intermediate transfer belt 10, to remove an attachment on intermediate transfer belt 10. In the present embodiment, cleaning member 426A is a cleaning blade. Cleaning member 426A is in sliding contact with the surface of intermediate transfer belt 10, to remove the transfer residual toner remaining on the surface of intermediate transfer belt 10 after secondary transfer.

Intermediate transfer belt 10 is in pressure contact with photoconductor drum 413, thereby allowing surface layer 16 of intermediate transfer belt 10 to adhere to the surface of photoconductor drum 413. Thus, intermediate transfer belt 10 adheres to photoconductor drum 413. Even if intermediate transfer belt 10 is in pressure contact with sheet S pressed by backup roller 423A, the surface of intermediate transfer belt 10 again adheres to sheet S. Thus, intermediate transfer belt 10 is excellent in contact ability with photoconductor drum 413 and sheet S.

Surface layer 16 of intermediate transfer belt 10 according to the present embodiment is configured from the polymerized cured product of the radical polymerizable composition including the radical polymerizable monomer having a (meth)acryloyl group, the oxime ester-based photopolymerization initiator having a carbazole structure, and the metal oxide particle subjected to surface treatment. That is, surface layer 16 of intermediate transfer belt 10 according to the present embodiment includes a carbazole compound as the residue substance originating from the photopolymerization initiator.

The carbazole structure has a bulky molecular structure, and therefore it is presumed that the residue substance cannot be moved in a gap of a molecular chain forming surface layer 16 and thus the residue substance cannot arrive at the surface of surface layer 16.

Furthermore, the photopolymerization initiator having a carbazole structure has a high absorbance coefficient, and therefore is high in reactivity in a radical polymerization reaction. Therefore, the amount of a small molecular residue substance originating from the unreacted component of the second radical not having a carbazole structure is reduced. Accordingly, the amount of the residue substance originating from the photopolymerization initiator, present on the surface of surface layer 16, is reduced in intermediate transfer belt 10 according to the present embodiment.

The residue substance is considered to enhance the frictional force of the surface layer against the cleaning member, and therefore a reduction in the amount of the residue substance on the surface of surface layer 16 means a reduction in the frictional force of surface layer 16 against the cleaning member. Thus, intermediate transfer belt 10 according to the present embodiment is excellent in durability (wear resistance). Image forming apparatus 1 including intermediate transfer belt 10 is hardly caused in cleaning failures, and therefore can stably form a high quality image over a long period.

On the contrary, a conventional intermediate transfer belt whose surface layer is configured by a polymerized cured product of a radical polymerizable composition including a photopolymerization initiator having no carbazole structure includes a photopolymerization initiator in which the residue substance originating from the photopolymerization initiator is small in size.

Accordingly, the residue substance originating from the photopolymerization initiator on the surface layer of the conventional intermediate transfer belt is considered to be able to be moved in a gap of a molecular chain forming the surface layer. Therefore, the residue substance can arrive at the surface of the surface layer in the conventional intermediate transfer belt.

The residue substance is high in affinity with the cleaning member in the image forming apparatus, and therefore the residue substance is present on the surface of the surface layer, thereby causing the frictional force of the surface layer against the cleaning member to be increased. Thus, an image forming apparatus including the conventional intermediate transfer belt may cause the cleaning member to be deformed and/or remarkably worn by a larger frictional force of the surface layer against the cleaning member, resulting in the occurrence of cleaning failures.

As is clear from the above description, the intermediate transfer belt according to the present embodiment is an endless intermediate transfer belt including a substrate layer, and a surface layer disposed on the substrate layer, in which the surface layer is configured by a polymerized cured product of a radical polymerizable composition including a radical polymerizable monomer having a radical polymerizable functional group, an oxime ester-based photopolymerization initiator having a carbazole structure, and a metal oxide particle subjected to surface treatment, the radical polymerizable functional group corresponds to one or both of an acryloyl group and a methacryloyl group, and the metal oxide particle subjected to surface treatment includes a metal oxide particle and a substance for support, supported on the surface of the metal oxide particle.

The method for producing the intermediate transfer belt according to the present embodiment is a method for producing an endless intermediate transfer belt including a substrate layer, and a surface layer disposed on the substrate layer, the method including coating the substrate layer with a radical polymerizable composition including a radical polymerizable monomer having one or both of an acryloyl group and a methacryloyl group, a photopolymerization initiator, and a metal oxide particle subjected to surface treatment as a metal oxide particle that supports a substance for support, to form a coating film of the radical polymerizable composition on the substrate layer, and irradiating the coating film with actinic radiation to polymerize the radical polymerizable monomer, thereby forming the surface layer, in which an oxime ester-based photopolymerization initiator having a carbazole structure is used as the photopolymerization initiator.

Accordingly, the intermediate transfer belt according to the present embodiment can allow the frictional force of the surface layer against a cleaning blade to be reduced, and is excellent in wear resistance (durability).

The image forming apparatus according to the present embodiment is an image forming apparatus including an intermediate transfer belt that transfers a toner image formed on a photoconductor to a recording medium, and a cleaning member that has elasticity and that abuts with the intermediate transfer belt to remove an attachment on the intermediate transfer belt, and the image forming apparatus includes the intermediate transfer belt according to the present embodiment. Accordingly, an image forming apparatus that can suppress the occurrence of cleaning failures and thus can stably form a high quality image over a long period can be provided.

It is also much more effective in terms of cleaning property and wear resistance (durability) that the photopolymerization initiator be a compound represented by general formula (1).

It is also much more effective in terms of cleaning property and wear resistance (durability) that the polymerized cured product include tertiary amine.

It is also much more effective in terms of hardness and wear resistance (durability) of the surface layer that the radical polymerizable monomer have number a of alkylene oxide structure(s) and number b of the radical polymerizable functional group(s), the alkylene oxide structure include an alkylene group having 2 or more carbon atoms, and both a and b represent a positive integer and satisfy the following expressions (1) and (2):

$$a/b \leq 5 \quad (1)$$

$$b \geq 3 \quad (2).$$

It is also much more effective in terms of cleaning property and transfer function that a and b further satisfy the following expression (3).

$$a/b \leq 3 \quad (3)$$

It is also much more effective in terms of increases in durability of the surface layer and reactivity of the radical polymerizable monomer that the alkylene group has independently 2 to 5 carbon atoms.

It is much more effective in terms of flexibility, cleaning property and transfer function of the surface layer that the substance for support have a radical polymerizable functional group.

EXAMPLES

Hereinafter, the present invention is described with reference to Examples in more detail. The present invention is not limited to the following Examples. In the following Examples, each operation is performed under an environment of room temperature (25° C.) and a relative humidity of 40 to 50%, unless otherwise particularly noted.

[Substrate Layer]

(Production of Substrate Layer 1)

First, the following components were loaded into a uniaxial extruder in the following amounts, and molten and kneaded to provide resin mixture 1.

| | |
|---|---|
| Polyphenylene sulfide | 100 parts by weight |
| Carbon black | 16 parts by weight |
| Ethylene-glycidyl methacrylate-acrylonitrile styrene | 1 part by weight |
| Calcium montanate | 0.2 parts by weight |

Polyphenylene sulfide (PSS) (E2180; produced by Toray Industries, Inc.) was used as a resin, carbon black (#3030B;

produced by Mitsubishi Chemical Corporation) was used as a conductive filler, ethylene-glycidyl methacrylate-acrylonitrile styrene (EGMA-AS) copolymer (Modiper A4400; produced by NOF Corporation, "Modiper" being a registered trademark of the Company) was used as a dispersant, and calcium montanate (CS-8CP; produced by Nitto Chemical Industry Co., Ltd.) was used as a lubricant.

Next, an annular die having an endless belt-shaped discharge port (slit) was mounted at the tip of the uniaxial extruder, and resin mixture 1 obtained was extruded through the discharge port. An endless belt-shaped resin mixture extruded through the discharge port was cooled and solidified by a cylindrical cooling tube provided at the tip of the discharge port. Thus, seamless cylindrical substrate layer 1 having a thickness of 120 μm was produced.

(Production of Substrate Layer 2)

First, the following components were mixed in the following amounts to provide resin mixture 2.

| Polyamideimide | 100 parts by weight |
|---|---|
| Carbon black | 23 parts by weight |

Polyamideimide (PAI) (Vylomax HR16NN; produced by Toyobo Co., Ltd., "Vylomax" being a registered trademark of the Company) was used as a resin, and carbon black subjected to oxidation treatment (SPECIAL BLACK4; produced by Degussa AG, pH: 3.0, volatile content: 14.0%) was used as a conductive filler.

Next, resin mixture 2 was divided to two portions, and a collision type disperser "Geanus PY" (manufactured by Geanus Co., Ltd.) was used for collision at a pressure of 200 MPa and a minimum area of 1.4 mm². Such portions were again allowed to pass through a pathway for dividing into two portions, five times, and mixed to provide a polyamideimide resin solution having carbon black. The interior of a cylindrical mold was coated with the polyamideimide resin solution having carbon black through a dispenser so that the thickness was 0.5 mm, and rotated at 1,500 rpm for 15 minutes to provide a spreading layer having a uniform thickness. Hot air at 60° C. was applied from the exterior of the mold for 30 minutes with further rotation at 250 rpm, and thereafter the layer was heated at 150° C. for 60 minutes. Thereafter, the temperature was raised to 250° C. at a rate of temperature rise of 2° C./min, and further heating was conducted at 250° C. for 60 minutes. Thereafter, the temperature was turned back to room temperature, and the mold was released to allow seamless cylindrical resin substrate layer 2 having a thickness of 120 μm to be produced.

(Production of Substrate Layer 3)

Substrate layer 3 was produced in the same manner as in substrate layer 1 except that polyether ether ketone (PEEK) (VICTREX PEEK381G; produced by Victrex PLC, "VICTREX" being a registered trademark of the Company) was used instead of polyphenylene sulfide (PPS).

(Production of Substrate Layer 4)

Dry carbon black subjected to oxidation treatment (SPECIAL BLACK4; produced by Degussa AG, pH: 3.0, volatile content: 14.0%) was added to a solution of a polyamide acid made of 3,3',4,4'-biphenyltetracarboxylic dianhydride (BPDA) and p-phenylenediamine (PDA) in N-methyl-2-pyrrolidone (NMP) (U-Varnish S; produced by Ube Industries, Ltd., solid content: 18 mass %) so that the amount thereof was 23 parts by weight based on 100 parts by weight of the solid content of the polyimide-based resin, thereby preparing resin mixture 3.

Next, resin mixture 3 was divided to two portions, and a collision type disperser "Geanus PY" (manufactured by Geanus Co., Ltd.) was used for collision at a pressure of 200 MPa and a minimum area of 1.4 mm². Such portions were again allowed to pass through a pathway for dividing into two portions, five times, and mixed to provide a polyamide acid solution having carbon black. The interior of a cylindrical mold was coated with the polyamide acid solution having carbon black through a dispenser so that the thickness was 0.5 mm, and rotated at 1,500 rpm for 15 minutes to provide a spreading layer having a uniform thickness.

Hot air at 60° C. was applied from the exterior of the mold for 30 minutes with further rotation at 250 rpm, and thereafter the layer was heated at 150° C. for 60 minutes. Thereafter, the temperature was raised to 360° C. at a rate of temperature rise of 2° C./min, and further heating was conducted at 360° C. for 30 minutes, to perform removal of the solvent, removal of water for dewatering cyclization, and completion of an imide conversion reaction. Finally, the temperature was turned back to room temperature, and the mold was released to allow seamless cylindrical substrate layer 4 having a thickness of 120 μm to be produced.

[Metal Oxide Particle]

(Production of Metal Oxide Particle 1)

First, the following components were mixed in the following amounts, and dispersed by using a wet media dispersion type apparatus, and thereafter the solvent was removed for drying at 150° C. for 30 minutes, thereby producing metal oxide fine particle 1 subjected to surface treatment.

| Tin oxide particle | 100 parts by weight |
|---|---|
| 8-Methacryloxyoctyltrimethoxysilane | 15 parts by weight |
| Toluene/Isopropyl alcohol | 400 parts by weight |

A tin oxide ($SnO_2$) particle having an average particle size of 21 nm (Nanotek $SnO_2$; produced by CIK Nanotek Corporation, "Nanotek" being a registered trademark of the Company) was used as a metal oxide particle, 8-methacryloxyoctyltrimethoxysilane (KBM-5803; produced by Shin-Etsu Chemical Co., Ltd.) was used as a surface treating agent (substance for support), and a mixed solvent of toluene and isopropyl alcohol (toluene:isopropyl alcohol=1:1 (mass ratio)) was used as a solvent.

(Production of Metal Oxide Particles 2 to 7)

Each of metal oxide fine particles 2 to 6 subjected to surface treatment was produced in the same manner as the production of metal oxide fine particle 1 subjected to surface treatment except that one or both of the metal oxide particle and the surface treating agent was/were changed as shown in Table 1. The tin oxide particle not subjected to surface treatment was defined as metal oxide particle 7.

An alumina ($Al_2O_3$) particle having an average particle size of 34 nm (Nanotek A1203; produced by CIK Nanotek Corporation,) or a silica ($SiO_2$) particle having an average particle size of 30 nm (AEROSIL50; "AEROSIL" being a registered trademark of Evonik Degussa GmbH) was further used as a metal oxide particle. 3-Acryloxypropyltrimethoxysilane (KBM-5103; produced by Shin-Etsu Chemical Co., Ltd.) or methyl hydrogen polysiloxane (KF-9901; produced by Shin-Etsu Chemical Co., Ltd.) was further used as a surface treating agent.

Table 1 shows, with respect to each metal oxide particle, the metal oxide particle No., the type of the metal oxide of the metal oxide particle, and the type of the surface treating agent.

TABLE 1

| | Metal oxide particle | |
|---|---|---|
| No. | Type | Surface treating agent |
| 1 | SnO$_2$ | KBM-5803 |
| 2 | SnO$_2$ | KBM-5103 |
| 3 | SnO$_2$ | KF-9901 |
| 4 | Al$_2$O$_3$ | KBM-5803 |
| 5 | Al$_2$O$_3$ | KF-9901 |
| 6 | SiO$_2$ | KBM-5803 |
| 7 | SnO$_2$ | — |

[Photopolymerization Initiator]
(Synthesis of Photopolymerization Initiator 1)
1) Step 1

First, 10.4 g (78 mmol) of aluminum chloride and 33.0 g of dichloroethane were charged under a nitrogen atmosphere, and 36 mmol of acetyl chloride was added thereto under ice cooling. Next, 30 mmol of 6-nitro-9-ethyl-9H-carbazole and 33.0 g of ethane dichloride were further dropped, and stirred at 5° C. for 30 minutes. Next, the reaction liquid was placed in ice water and subjected to oil/water separation. Next, the solvent was removed to thereby provide acyl compound 1.

2) Step 2

Charged were 20 mmol of acyl compound 1, 2.1 g (30 mmol) of hydroxylammonium chloride, and 16.9 g of dimethylformamide (DMF) under a nitrogen atmosphere, and stirred at 80° C. for 1 hour. Next, the reaction liquid was placed in ice water and subjected to oil/water separation. Next, the solvent was removed, thereafter 25.4 g of butyl acetate was added to the residue, and then 2.45 g (24 mmol) of acetic anhydride was further added, stirred at 90° C. for 1 hour, and thereafter cooled to room temperature. Finally, the reaction liquid was neutralized by an aqueous 5% sodium hydroxide solution, and subjected to oil/water separation to remove the solvent, and to recrystallization with ethyl acetate as a solvent, thereby providing photopolymerization initiator 1.

(Synthesis of Photopolymerization Initiator 2)

Photopolymerization initiator 2 was obtained by the same method as in photopolymerization initiator 1 except that 6-nitro-9-propyl-9H-carbazole was used instead of 6-nitro-9-ethyl-9H-carbazole.

(Synthesis of Photopolymerization Initiator 3)
1) Step 1

First, 15.0 g (75 mmol) of 9-ethyl-9H-carbazole was added to 100 g of dehydrated dichloroethane and dissolved under a nitrogen atmosphere. Next, 10.6 g (79 mmol) of aluminum chloride was further added under ice cooling, and then 75 mmol of benzochloride was slowly dropped at 5° C. or less. Next, the resultant was stirred at normal temperature for 5 hours until the temperature was 0° C. or less, and thereafter 10.6 g (79 mmol) of aluminum chloride was added. Next, 75 mmol of acetyl chloride was slowly dropped at 5° C. or less. Next, the resultant was stirred at normal temperature (20° C.) for 3 hours, thereafter the reaction liquid was slowly added to 100 mL of ice water with the temperature being 0° C. or less, and stirred for 1 hour to perform oil/water separation. Finally, the solvent was removed by a rotary evaporator, and purification was performed with ethyl acetate and dichloroethane as a solvent, thereby providing acyl compound 2.

2) Step 2

Next, 9.0 g of acyl compound 2 was added to a mixed liquid of 35 mL of ethanol and 6 mL of distilled water. To the mixed liquid were further added 1.6 g of hydroxylammonium chloride and 3.2 g of sodium acetate. Next, the reaction solution was refluxed for 7 hours, and thereafter distilled water at about 10° C. was added to provide a precipitate. The precipitate was subjected to filtration, and washed with distilled water. Finally, the precipitate washed with distilled water was further washed with ethanol, and thereafter dried to provide acyl compound 3.

3) Step 3

Next, 7.5 g of acyl compound 3 and 1.6 g of triethylamine were added to 50 mL of dichloroethane at 0° C. under a nitrogen atmosphere, and a solution in which 1.3 g of acetyl chloride was dissolved in 5 mL of methylene chloride was further slowly added. Next, the reaction liquid was stirred at 10° C. for 3 hours, and thereafter water was added to the reaction solution several times to wash an organic layer. Next, a solid compound obtained by distillation at a reduced pressure was added to a mixed liquid of 50 mL of acetonitrile and 50 mL of dichloroethane, refluxed for 1 hour, and thereafter left to stand at 0° C. for 3 hours. Finally, the resultant was subjected to filtration to provide photopolymerization initiator 3.

(Synthesis of Photopolymerization Initiator 4)

Photopolymerization initiator 4 was synthesized by the same method as in photopolymerization initiator 3 except that propionyl chloride was used instead of acetyl chloride in step 1.

(Synthesis of Photopolymerization Initiator 5)

Photopolymerization initiator 5 was synthesized by the same method as in photopolymerization initiator 3 except that 2-methylbenzoyl chloride was used instead of benzoyl chloride in step 1.

(Synthesis of Photopolymerization Initiator 6)

Photopolymerization initiator 6 was synthesized by the same method as in photopolymerization initiator 3 except that 2,4,6-trimethylbenzoyl chloride was used instead of benzoyl chloride in step 1.

(Synthesis of Photopolymerization Initiator 7)

Photopolymerization initiator 7 was synthesized by the same method as in photopolymerization initiator 3 except that 2-thionyl chloride was used instead of benzoyl chloride in step 1.

(Synthesis of Photopolymerization Initiator 8)

Photopolymerization initiator 8 was synthesized by the same method as in photopolymerization initiator 5 except that 4-nitrobenzoyl chloride was used instead of acetyl chloride in step 1.

(Synthesis of Photopolymerization Initiator 9)

Photopolymerization initiator 9 was synthesized by the same method as in photopolymerization initiator 8 except that 2-thionylbenzoyl chloride was used instead of 2-methylbenzoyl chloride in step 1.

[Production of Intermediate Transfer Belt 1]

The following components were dissolved and dispersed in the following amounts in methyl isobutyl ketone (MIBK) so that the solid concentration was 20 vol %, to prepare a diluted liquid, thereby preparing coating solution 1 for surface layer formation as a radical polymerizable composition.

| | |
|---|---|
| Ethoxylated (12) DPHA | 75 parts by volume |
| Metal oxide particle 1 | 25 parts by volume |
| Photopolymerization initiator 1 | 4 parts by volume |
| Tertiary amine 1 | 1 part by volume |

Ethoxylated (12) dipentaerythritol hexaacrylate (ethoxylated (12) DPHA) (DPEA-12; produced by Nippon Kayaku Co., Ltd.) was used as a radical polymerizable monomer, and P-dimethylaminobenzoic acid ethyl ester (KAYACURE EPA; produced by Nippon Kayaku Co., Ltd., "KAYACURE" being a registered trademark of the Company) was used as a tertiary amine.

Next, the outer peripheral surface of substrate layer 1 was coated with coating solution 1 for surface layer formation by a dip coating method in the following coating conditions so that the dry film thickness was 4 μm, to form a coating film. The coating film was irradiated with ultraviolet light as actinic energy radiation in the following irradiation conditions, thereby curing the coating film to form a surface layer, thereby producing intermediate transfer belt 1. Herein, such irradiation of the coating film with ultraviolet light was performed while a light source was secured and a resin substrate layer where the coating film was formed on the outer peripheral surface was rotated at a circumferential speed of 60 mm/sec.

(Coating Conditions)
Amount of coating solution fed: 1 L/min
Pulling-up speed: 10 mm/sec
(Irradiation Conditions)
Type of light source: 365 nm LED light source (SPX-TA; manufactured by REVOX Inc.)
Distance from irradiation port to coating film surface: 100 mm
Atmosphere: nitrogen
Amount of irradiation light: 1 J/cm$^2$
Radiation illuminance: 150 mW/cm$^2$
Irradiation time (time during which the substrate layer was rotated): 240 seconds

[Production of Intermediate Transfer Belts 2 to 4]

Each of intermediate transfer belts 2 to 4 was produced by the same method as in intermediate transfer belt 1 except that the type of the photopolymerization initiator was changed as shown in Table 2.

[Production of Intermediate Transfer Belt 5]

Intermediate transfer belt 5 was produced by the same method as in intermediate transfer belt 1 except that the type of the resin of the substrate layer, the type of the photopolymerization initiator and the type of the radical polymerizable monomer were changed as shown in Tables 2 and 4. Ethoxylated (12) dipentaerythritol hexamethacrylate (ethoxylated (12) DPHMA) (M-DPH-12E; produced by Shin-Nakamura Chemical Co., Ltd.) was used as the radical polymerizable monomer.

[Production of Intermediate Transfer Belts 6 and 7]

Each of intermediate transfer belts 6 and 7 was produced by the same method as in intermediate transfer belt 1 except that the type of the photopolymerization initiator and the type of the radical polymerizable monomer were changed as shown in Tables 2 and 4. In production of intermediate transfer belt 6, ethoxylated (3) trimethylolpropane triacrylate (ethoxylated (3) TMPTA) (KAYARAD TPA-330; produced by Nippon Kayaku Co., Ltd.) was used as the radical polymerizable monomer. In production of intermediate transfer belt 7, ethoxylated (8) pentaerythritoltetraacrylate (ethoxylated (8) PETTA) (ATM-8EL; produced by Shin-Nakamura Chemical Co., Ltd.) was used as the radical polymerizable monomer.

[Production of Intermediate Transfer Belt 8]

Intermediate transfer belt 8 was produced by the same method as in intermediate transfer belt 4 except that the type of the resin of the substrate layer and the content of the radical polymerizable monomer were changed as shown in Table 2.

[Production of Intermediate Transfer Belt 9]

Intermediate transfer belt 9 was produced by the same method as in intermediate transfer belt 4 except that no tertiary amine was added and the content of the radical polymerizable monomer was changed as shown in Table 2.

[Production of Intermediate Transfer Belt 10]

Intermediate transfer belt 10 was produced by the same method as in intermediate transfer belt 4 except that the type of the metal oxide particle and the type of the radical polymerizable monomer were changed as shown in Tables 2 and 4. Caprolactone-modified (6) DPHA (KAYARAD DPCA-60; produced by Nippon Kayaku Co., Ltd.) was used as the radical polymerizable monomer.

[Production of Intermediate Transfer Belt 11]

Intermediate transfer belt 11 was produced by the same method as in intermediate transfer belt 9 except that the type of the resin of the substrate layer, the type of the metal oxide particle and the content of the radical polymerizable monomer were changed as shown in Table 2.

[Production of Intermediate Transfer Belt 12]

Intermediate transfer belt 12 was produced by the same method as in intermediate transfer belt 1 except that the type of the tertiary amine and the type of the metal oxide particle were changed as shown in Table 2. 4'-Dimethylaminoacetophenone (produced by Tokyo Chemical Industry Co., Ltd.) was used as the tertiary amine.

[Production of Intermediate Transfer Belt 13]

Intermediate transfer belt 13 was produced by the same method as in intermediate transfer belt 1 except that no tertiary amine was added and the type of the metal oxide particle was changed as shown in Table 2.

[Production of Intermediate Transfer Belt 14]

Intermediate transfer belt 14 was produced by the same method as in intermediate transfer belt 1 except that no tertiary amine was added as shown in Table 2.

[Production of Intermediate Transfer Belt 15]

Intermediate transfer belt 15 was produced by the same method as in intermediate transfer belt 4 except that the type of the metal oxide particle was changed as shown in Table 2.

[Production of Intermediate Transfer Belt 16]

Intermediate transfer belt 16 was produced by the same method as in intermediate transfer belt 5 except that the type of the photopolymerization initiator and the type of the polymerizable monomer were changed as shown in Tables 2 and 4. Ethoxylated (35) PETTA (TM-35E; produced by Shin-Nakamura Chemical Co., Ltd.) was used as the radical polymerizable monomer.

[Production of Intermediate Transfer Belt 17]

Intermediate transfer belt 17 was produced by the same method as in intermediate transfer belt 8 except that the content of the metal oxide particle, and the type and the content of the polymerizable monomer were changed as shown in Tables 2 and 4. Ethoxylated (15) trimethylolpropane triacrylate (ethoxylated (15) TMPTA) (SR9035; produced by Sartomer) was used as the radical polymerizable monomer.

[Production of Intermediate Transfer Belt 18]

Intermediate transfer belt 18 was produced by the same method as in intermediate transfer belt 4 except that the type of the polymerizable monomer was changed as shown in Tables 2 and 4. Dipentaerythritol hexaacrylate (DPHA) (KAYARAD DPHA; produced by Nippon Kayaku Co., Ltd.) and polyethylene glycol (PEG) diacrylate (A-400; produced by Shin-Nakamura Chemical Co., Ltd.) were used for the radical polymerizable monomer.

[Production of Intermediate Transfer Belts C1 and C2]

Each of intermediate transfer belts C1 and C2 was produced by the same method as in intermediate transfer belt 1 except that the type of the photopolymerization initiator was changed as shown in Table 3. Photopolymerization initiator C-1 used in production of intermediate transfer belt C1 was an acylphosphine oxide-based photopolymerization initiator having no carbazole structure (Irgacure 819; produced by BASF SE, "IRGACURE" being a registered trademark of the Company).

Photopolymerization initiator C-2 used in production of intermediate transfer belt C2 was an alkylphenone-based photopolymerization initiator having no carbazole structure (Irgacure 379EG; produced by BASF SE).

[Production of Intermediate Transfer Belt C3]

Intermediate transfer belt C3 was produced by the same method as in intermediate transfer belt 1 except that the type of the metal oxide particle was changed as shown in Table 3.

[Production of Intermediate Transfer Belt C4]

Intermediate transfer belt C4 was produced by the same method as in intermediate transfer belt 1 except that no metal oxide particle was added as shown in Table 3.

Tables 2 and 3 show, with respect to each intermediate transfer belt, the class, the intermediate transfer belt No., the substrate layer No. and the type of the resin in the substrate layer, the photopolymerization initiator No. and the content of the photopolymerization initiator, the tertiary amine No. and the content of the tertiary amine, the metal oxide particle (MOP) No. and the content of the metal oxide particle, and the type, the content and the equivalent of the functional group of the radical polymerizable monomer. Table 2 shows each intermediate transfer belt according to Examples, and Table 3 shows each intermediate transfer belt according to Comparative Examples. Table 4 shows, with respect to each radical polymerizable monomer, the compound name, the number (a) of alkylene oxide structure(s), the number (b) of radical polymerizable functional group(s), and a/b. In Table 2 and Table 3, "Belt No." means intermediate transfer belt No.

TABLE 2

| | | Substrate layer | | Surface layer | | | | | | | |
|---|---|---|---|---|---|---|---|---|---|---|---|
| | | | | Photo-polymerization initiator | | Tertiary amine | | MOP | | Radical polymerizable monomer | |
| Class | Belt No. | No. | Resin | No. | Content [part(s) by volume] | No. | Content [part(s) by volume] | No. | Content [part(s) by volume] | Type | Content [part(s) by volume] | Functional group [g/mol] |
| Example | 1 | 1 | PPS | 1 | 4 | 1 | 1 | 1 | 25 | A | 75 | 184 |
| | 2 | 1 | PPS | 2 | 4 | 1 | 1 | 1 | 25 | A | 75 | 184 |
| | 3 | 1 | PPS | 3 | 4 | 1 | 1 | 1 | 15 | A | 75 | 184 |
| | 4 | 1 | PPS | 5 | 4 | 1 | 1 | 1 | 25 | A | 75 | 184 |
| | 5 | 2 | PAI | 6 | 4 | 1 | 1 | 1 | 25 | B | 75 | 198 |
| | 6 | 1 | PPS | 8 | 4 | 1 | 1 | 1 | 25 | C | 75 | 142 |
| | 7 | 1 | PPS | 9 | 4 | 1 | 1 | 1 | 25 | D | 75 | 176 |
| | 8 | 3 | PEEK | 5 | 4 | 1 | 1 | 1 | 25 | A | 70 | 184 |
| | 9 | 1 | PPS | 5 | 4 | — | — | 1 | 25 | A | 80 | 184 |
| | 10 | 1 | PPS | 5 | 4 | 1 | 1 | 4 | 25 | E | 75 | 210 |
| | 11 | 4 | PI | 5 | 4 | — | — | 2 | 25 | A | 75 | 184 |
| | 12 | 1 | PPS | 1 | 4 | 2 | 1 | 3 | 25 | A | 75 | 184 |
| | 13 | 1 | PPS | 1 | 4 | — | — | 5 | 25 | A | 75 | 184 |
| | 14 | 1 | PPS | 1 | 4 | — | — | 1 | 25 | A | 75 | 184 |
| | 15 | 1 | PPS | 5 | 4 | 1 | 1 | 6 | 25 | A | 75 | 184 |
| | 16 | 2 | PAI | 5 | 4 | 1 | 1 | 1 | 25 | F | 75 | 473 |
| | 17 | 3 | PEEK | 5 | 4 | 1 | 1 | 1 | 40 | G | 60 | 318 |
| | 18 | 1 | PPS | 5 | 4 | 1 | 1 | 1 | 25 | H | 50 | 244 |
| | | | | | | | | | | I | 25 | |

TABLE 3

| | | Substrate layer | | Surface layer | | | | | | | |
|---|---|---|---|---|---|---|---|---|---|---|---|
| | | | | Photo-polymerization initiator | | Tertiary amine | | MOP | | Radical polymerizable monomer | |
| Class | Belt No. | No. | Resin | No. | Content [part(s) by volume] | No. | Content [part(s) by volume] | No. | Content [part(s) by volume] | Type | Content [part(s) by volume] | Functional group [g/mol] |
| Comparative Example | C1 | 1 | PPS | C-1 | 4 | 1 | 1 | 1 | 25 | A | 75 | 184 |
| | C2 | 1 | PPS | C-2 | 4 | 1 | 1 | 1 | 25 | A | 75 | 184 |
| | C3 | 1 | PPS | 5 | 4 | 1 | 1 | 7 | 25 | A | 75 | 184 |
| | C4 | 1 | PPS | 5 | 4 | 1 | 1 | — | — | A | 75 | 184 |

TABLE 4

| Radical polymerizable monomer | | | | |
|---|---|---|---|---|
| Type | Compound | a | b | a/b |
| A | Ethoxylated (12) DPHA | 12 | 6 | 2 |
| B | Ethoxylated (12) DPHMA | 12 | 6 | 2 |
| C | Ethoxylated (3) TMPTA | 3 | 3 | 1 |
| D | Ethoxylated (8) PETTA | 8 | 4 | 2 |
| E | Caprolactone-modified (6) DPHA | 6 | 6 | 1 |
| F | Ethoxylated (35) PETTA | 35 | 4 | 8.75 |
| G | Ethoxylated (15) TMPTA | 15 | 3 | 5 |
| H | DPHA | 1 | 6 | 0.17 |
| I | PEG diacrylate | 9 | 2 | 4.5 |

[Evaluation]
(1) Cleaning Property

A full-color image forming apparatus (bizhub C554; manufactured by Konica Minolta Business Technologies Inc. ("bizhub" being a registered trademark of Konica Minolta, Inc.) onto which each of intermediate transfer belts 1 to 18 and C1 to C4 was mountable was prepared as an evaluation apparatus of cleaning property. Each of the intermediate transfer belts was mounted onto the evaluation apparatus, and cleaning property after the following endurance test was evaluated.

More specifically, an endurance test was performed where an image having a coverage rate of 2.5% of each color of yellow (Y), magenta (M), cyan (C) and black (K) was printed for 600,000 sheets of neutralized paper under an environment of 20° C. and 50% RH. An image in which the coverage rate of cyan (C) after the endurance test was 100% (solid image) was printed for 100 sheets of neutralized paper, and thereafter an image in which the coverage rate of yellow (Y) was 100% (solid image) was printed under each environment of:
1) 20° C. and 50% RH;
2) 10° C. and 15% RH; and
3) 30° C. and 80% RH;
and cleaning property was evaluated based on the following evaluation criteria. Respective cases where the evaluation ratings were "A", "B" and "C" were determined as passing.

(Evaluation Criteria)
A: any stain was not caused on the image printed, in all the environments.
B: while any stain was not caused on the image printed, under an environment of 20° C. and 50% RH, any streak stain was caused in either an environment of 10° C. and 15% RH or an environment of 30° C. and 80% RH.
C: while streak stain was slightly caused under an environment of 20° C. and 50% RH, the stain disappeared within a number of 10 printing sheets in further printing of the image in which the coverage rate of yellow (Y) was 100%.
D: band-shaped stain was clearly caused under an environment of 20° C. and 50% RH.

(2) Transfer Rate

A full-color image forming apparatus (bizhub; manufactured by Konica Minolta, Inc. ("bizhub" being a registered trademark of the Company) PRESS C8000) onto which each of intermediate transfer members 1 to 18 and C1 to C4 was mountable was prepared as an evaluation apparatus of the transfer rate. Each of the intermediate transfer members was mounted onto the evaluation apparatus, and the transfer rates before and after the endurance test were determined.

More specifically, an endurance test was performed where an image having a coverage rate of 2.5% of each color of yellow (Y), magenta (M), cyan (C) and black (K) was printed for 600,000 sheets of neutralized paper under an environment of 20° C. and 50% RH. Weight A (g) of the toner on each intermediate transfer belt before secondary transfer and weight B (g) of the transfer residual toner on each intermediate transfer belt after secondary transfer were measured immediately after the start of the endurance test and after the endurance test, and the transfer rate (%) was calculated according to the following expression (5).

Weight A was determined from the result obtained by taking the toner in regions (three positions of 10 mm×50 mm) having a predetermined area, of the surface of each intermediate transfer belt after primary transfer and before secondary transfer, by use of a suction apparatus. Weight B was determined from the relationship between the toner weight measured in advance and the color measurement value obtained by taking the transfer residual toner on each intermediate transfer belt after secondary transfer, by a booker tape, pasting the booker tape onto a white sheet, and thereafter subjecting the white sheet to color measurement with a spectrophotometer (CM-2002; manufactured by Konica Minolta Sensing Inc.). Respective cases where the evaluation ratings were "A", "B" and "C" were determined as passing.

$$\text{Transfer rate } (\%) = \{1 - (B/A)\} \times 100 \quad (5)$$

(Evaluation Criteria)
A: the transfer rate was 98% or more
B: the transfer rate was 95% or more and less than 98%
C: the transfer rate was 90% or more and less than 95%
D: the transfer rate was less than 90%

Table 5 shows, with respect to each intermediate transfer belt, the class, the intermediate transfer belt No., the evaluation results of cleaning property, and the evaluation results of the transfer rate. In Table 5, "Belt No." means the intermediate transfer belt No.

TABLE 5

| Class | Belt No. | Cleaning property | Transfer rate |
|---|---|---|---|
| Example | 1 | A | A |
| | 2 | B | A |
| | 3 | B | B |
| | 4 | A | A |
| | 5 | A | B |
| | 6 | B | B |
| | 7 | B | A |
| | 8 | B | A |
| | 9 | B | A |
| | 10 | A | A |
| | 11 | B | A |
| | 12 | B | B |
| | 13 | A | B |
| | 14 | B | A |
| | 15 | A | B |
| | 16 | C | C |
| | 17 | B | C |
| | 18 | C | C |
| Comparative Example | C1 | D | B |
| | C2 | D | B |
| | C3 | D | C |
| | C4 | D | D |

As clear from Table 5, all intermediate transfer belts 1 to 18 according to Examples were excellent in cleaning property and transfer rate. The reason for this was considered because the surface layer was configured by the polymerized cured product of the radical polymerizable composition including the radical polymerizable monomer having a radical polymerizable functional group, the oxime ester-based photopolymerization initiator having a carbazole structure, and the metal oxide particle subjected to surface treatment.

In particular, intermediate transfer belt 1 was more excellent in cleaning property than intermediate transfer belt 14. The reason for this was considered because the surface layer was configured by the polymerized cured product of the radical polymerizable composition including the tertiary amine.

On the contrary, all intermediate transfer belts C1 to C4 according to Comparative Examples were insufficient in one or both of cleaning property and the transfer rate. The reason for this was considered because the surface layer in each of intermediate transfer belts C1 and C2 was configured by the polymerized cured product of the radical polymerizable composition including the photopolymerization initiator having no carbazole structure.

The reason was also considered because the surface layer in intermediate transfer belt C3 was configured by the polymerized cured product of the radical polymerizable composition including the metal oxide particle not subjected to surface treatment. Furthermore, the reason was also considered because the surface layer in intermediate transfer belt C4 was configured by the polymerized cured product of the radical polymerizable composition including no metal oxide particle.

Although embodiments of the present invention have been described and illustrated in detail, it is clearly understood that the same is by way of illustration and example only and not limitation, the scope of the present invention should be interpreted by terms of the appended claims.

INDUSTRIAL APPLICABILITY

The present invention can provide an intermediate transfer belt excellent in both of cleaning property and durability, and can provide an image forming apparatus not causing any transfer failures over a long period.

What is claimed is:
1. An endless intermediate transfer belt comprising a substrate layer, and a surface layer to be disposed on the substrate layer, wherein
   the surface layer is configured by a polymerized cured product of a radical polymerizable composition comprising a radical polymerizable monomer having a radical polymerizable functional group, an oxime ester-based photopolymerization initiator having a carbazole structure, and a metal oxide particle subjected to surface treatment,
   the radical polymerizable functional group corresponds to one or both of an acryloyl group and a methacryloyl group,
   the metal oxide particle subjected to surface treatment comprises a metal oxide particle, and a substance for support, to be supported on a surface of the metal oxide particle,
   the photopolymerization initiator is a compound represented by general formula (1):

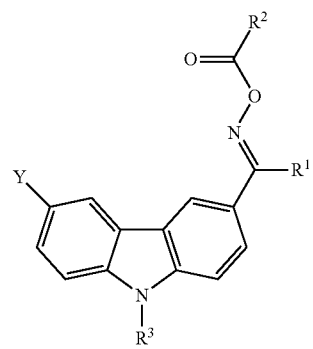

wherein $R^1$ represents a $C_{1-20}$ alkyl group, a $C_{6-30}$ aryl group, a $C_{7-30}$ arylalkyl group or a cyano group, each hydrogen atom of the alkyl group, the aryl group and the arylalkyl group represented by $R^1$ may be independently optionally replaced by —$OR^{11}$, —$COR^{11}$, —$SR^{11}$, —$NR^{12}R^{13}$, —$NCOR^{12}$, —$OCOR^{13}$, —CN, —$NO_2$, a halogen atom, —$CR^{11}$=$CR^{12}R^{13}$ or —CO—$CR^{11}$=$CR^{12}R^{13}$, and $R^{11}$, $R^{12}$, and $R^{13}$ each represent a hydrogen atom, a $C_{1-20}$ alkyl group, a $C_{6-30}$ aryl group, a $C_{7-30}$ arylalkyl group or a $C_{2-20}$ heterocyclic group;

$R^2$ represents $R^{21}$ or $OR^{21}$, $R^{21}$ represents a $C_{1-20}$ alkyl group, a $C_{6-30}$ aryl group or a $C_{7-30}$ arylalkyl group, and each hydrogen atom of the alkyl group, the aryl group and the arylalkyl group represented by $R^{21}$ may be independently optionally replaced by a halogen atom;

$R^3$ represents a $C_{1-20}$ alkyl group, a $C_{6-30}$ aryl group or a $C_{7-30}$ arylalkyl group;

an alkylene moiety of a substituent represented by each of $R^1$, $R^3$, $R^{11}$, $R^{12}$, and $R^{13}$ may be interrupted by an unsaturated bond, an ether bond, a thioether bond, an ester bond, a thioester bond, an amide bond or a urethane bond once to 5 times, an alkyl moiety of the substituent may be branched alkyl or cyclic alkyl, a terminal of the substituent may be an unsaturated bond, and $R^3$ may be taken together with a benzene ring of the carbazole structure to form a ring; and Y represents a nitro group or a substituent represented by any one of chemical formulae (Y-1) to (Y-19):

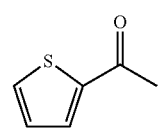

(Y-1)

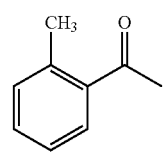

(Y-2)

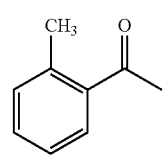

(Y-3)

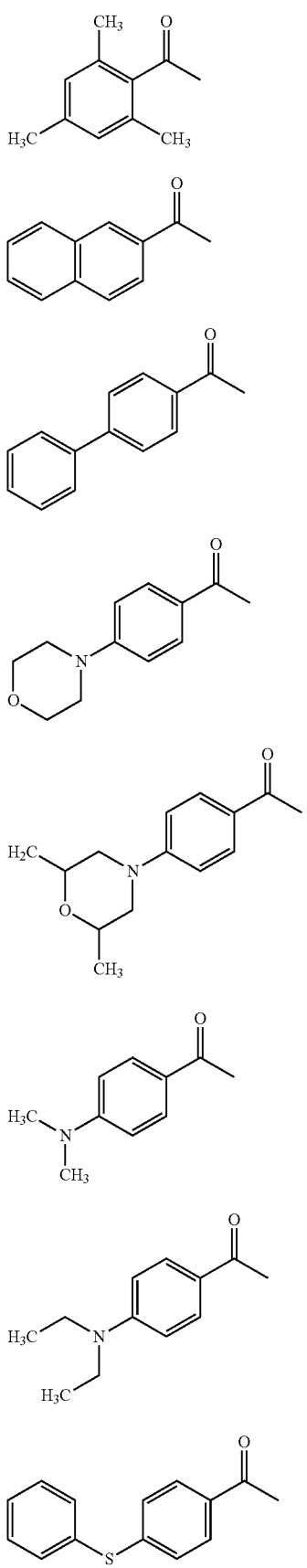
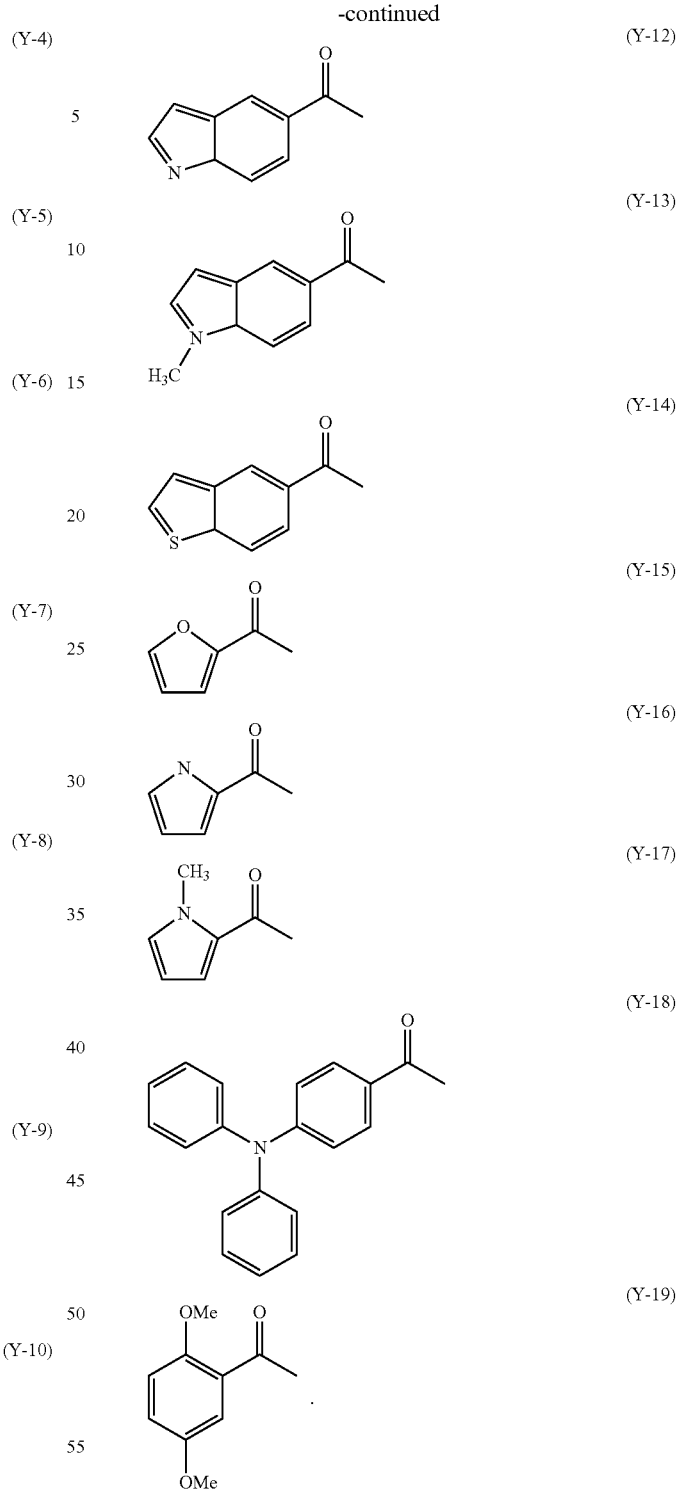
2. The intermediate transfer belt according to claim 1, wherein the polymerized cured product comprises tertiary amine.
3. The intermediate transfer belt according to claim 1, wherein
the radical polymerizable monomer has number a of alkylene oxide structure(s) and number b of the radical polymerizable functional group(s), the alkylene oxide structure comprises an alkylene group having 2 or more carbon atoms, and both a and b represent a positive integer, and satisfy the following expressions (1) and (2):

$$a/b \leq 5 \qquad (1)$$

$$b \leq 3 \qquad (2).$$

4. The intermediate transfer belt according to claim 3, wherein a and b further satisfy the following expression (3):

$$a/b \leq 3 \qquad (3).$$

5. The intermediate transfer belt according to claim 3, wherein the alkylene group has independently 2 to 5 carbon atoms.

6. The intermediate transfer belt according to claim 1, wherein the substance for support has a radical polymerizable functional group.

7. An image forming apparatus comprising an intermediate transfer belt that transfers a toner image formed on a photoconductor to a recording medium, and a cleaning member that has elasticity and that abuts with the intermediate transfer belt to remove an attachment on the intermediate transfer belt, wherein the intermediate transfer belt is the intermediate transfer belt according to claim 1.

8. A method for producing an endless intermediate transfer belt comprising a substrate layer, and a surface layer to be disposed on the substrate layer, the method comprising:

coating the substrate layer with a radical polymerizable composition comprising a radical polymerizable monomer having one or both of an acryloyl group and a methacryloyl group, a photopolymerization initiator, and a metal oxide particle subjected to surface treatment as a metal oxide particle that supports a substance for support, to form a coating film of the radical polymerizable composition on the substrate layer; and irradiating the coating film with actinic radiation to polymerize the radical polymerizable monomer, thereby forming the surface layer, wherein the photopolymerization initiator is a compound represented by general formula (1):

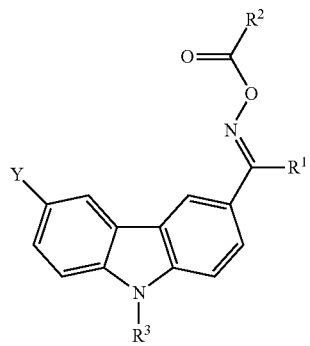

wherein $R^1$ represents a $C_{1-20}$ alkyl group, a $C_{6-30}$ aryl group, a $C_{7-30}$ arylalkyl group or a cyano group, each hydrogen atom of the alkyl group, the aryl group and the arylalkyl group represented by $R^1$ may be independently optionally replaced by —$OR^{11}$, —$COR^{11}$, —$SR^{11}$, —$NR^{12}R^{13}$, —$NCOR^{12}$, —$OCOR^{13}$, —CN, —$NO_2$, a halogen atom, —$CR^{11}$=$CR^{12}R^{13}$ or —CO—$CR^{11}$=$CR^{12}R^{13}$, and $R^{11}$, $R^{12}$, and $R^{13}$ each represent a hydrogen atom, a $C_{1-20}$ alkyl group, a $C_{6-30}$ aryl group, a $C_{7-30}$ arylalkyl group or a $C_{2-20}$ heterocyclic group;

$R^2$ represents $R^{21}$ or $OR^{21}$, $R^{21}$ represents a $C_{1-20}$ alkyl group, a $C_{6-30}$ aryl group or a $C_{7-30}$ arylalkyl group, and each hydrogen atom of the alkyl group, the aryl group and the arylalkyl group represented by $R^{21}$ may be independently optionally replaced by a halogen atom;

$R^3$ represents a $C_{1-20}$ alkyl group, a $C_{6-30}$ aryl group or a $C_{7-30}$ arylalkyl group;

an alkylene moiety of a substituent represented by each of $R^1$, $R^3$, $R^{11}$, $R^{12}$, and $R^{13}$ may be interrupted by an unsaturated bond, an ether bond, a thioether bond, an ester bond, a thioester bond, an amide bond or a urethane bond once to 5 times, an alkyl moiety of the substituent may be branched alkyl or cyclic alkyl, a terminal of the substituent may be an unsaturated bond, and $R^3$ may be taken together with a benzene ring of the carbazole structure to form a ring; and Y represents a nitro group or a substituent represented by any one of chemical formulae (Y-1) to (Y-19):

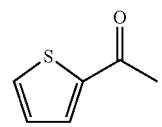

(Y-1)

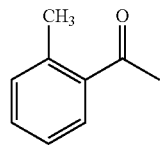

(Y-2)

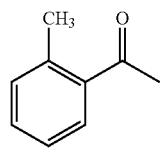

(Y-3)

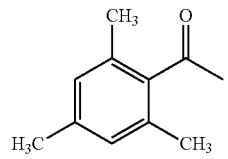

(Y-4)

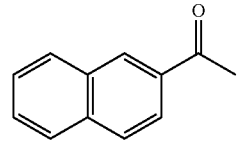

(Y-5)

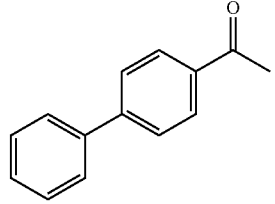

(Y-6)

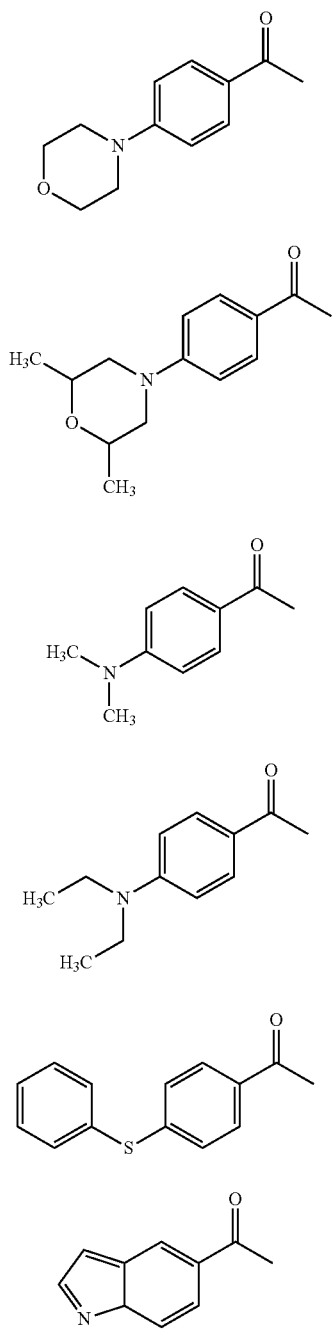
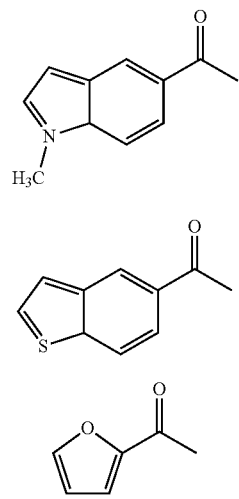
* * * * *